US010870279B2

United States Patent
Kondo et al.

(10) Patent No.: US 10,870,279 B2
(45) Date of Patent: Dec. 22, 2020

(54) METHOD OF MANUFACTURING LIQUID SUPPLY UNIT

(71) Applicant: CANON KABUSHIKI KAISHA, Tokyo (JP)

(72) Inventors: Soji Kondo, Yokohama (JP); Yukuo Yamaguchi, Tokyo (JP); Toshiaki Hirosawa, Hiratsuka (JP); Hiromasa Amma, Kawasaki (JP); Takuya Iwano, Inagi (JP); Noriyasu Nagai, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 303 days.

(21) Appl. No.: 15/806,700

(22) Filed: Nov. 8, 2017

(65) Prior Publication Data
US 2018/0141340 A1    May 24, 2018

(30) Foreign Application Priority Data
Nov. 24, 2016   (JP) .................. 2016-228216

(51) Int. Cl.
*B41J 2/16*   (2006.01)
*B41J 2/14*   (2006.01)
(Continued)

(52) U.S. Cl.
CPC ......... *B41J 2/1637* (2013.01); *B41J 2/14088* (2013.01); *B41J 2/14145* (2013.01);
(Continued)

(58) Field of Classification Search
CPC .. B41J 2/14088; B41J 2/14145; B41J 2/1603; B41J 2/1623; B41J 2/1637;
(Continued)

(56) References Cited

U.S. PATENT DOCUMENTS 3,830,613 A * 8/1974 Aoki ................... B29C 45/0408
                                                    425/575
10,434,694 B2 * 10/2019 Iijima ................. B29C 45/1635
(Continued)

FOREIGN PATENT DOCUMENTS

JP   50-006856 B1   3/1975
JP   62-087315 A    4/1987
(Continued)

OTHER PUBLICATIONS

Notice of Reasons for Refusal in Japanese Application No. 2016-228216 (dated Sep. 2020).

*Primary Examiner* — A. Dexter Tugbang
(74) *Attorney, Agent, or Firm* — Venable LLP

(57) ABSTRACT

A method of manufacturing a liquid supply unit includes a first molding step and a second molding step. In a first molding step, a resin is injected into different positions inside a mold assembly and a first member having a first contact portion, a second member having a second contact portion and an intermediate passage member having a passage structure to connect the first contact portion to the second contact portion are molded. In a second molding step, the mold assembly is disassembled, a die slide mold disposed inside the mold assembly is moved for positioning the members. Then, the mold assembly is clamped again and a resin is injected into the mold assembly. The first contact portion and the second contact portion are respectively held on the same surfaces inside the mold assembly during a period from the first molding step to completion of the second molding step.

5 Claims, 15 Drawing Sheets

(51) Int. Cl.
  *B29C 45/16* (2006.01)
  *B29C 45/32* (2006.01)
  *B29C 45/02* (2006.01)
  *B29C 45/04* (2006.01)

(52) U.S. Cl.
  CPC .......... *B41J 2/1603* (2013.01); *B41J 2/1623* (2013.01); *B29C 45/02* (2013.01); *B29C 45/04* (2013.01); *B29C 45/0408* (2013.01); *B29C 45/1635* (2013.01); *B29C 45/32* (2013.01); *B41J 2202/12* (2013.01); *B41J 2202/19* (2013.01); *B41J 2202/21* (2013.01); *Y10T 29/49401* (2015.01)

(58) Field of Classification Search
  CPC ................ B41J 2202/12; B41J 2202/19; B41J 2202/21; B29C 45/0408; B29C 45/1635; B29C 45/32; B29C 45/02; B29C 45/04; Y10T 29/49401
  See application file for complete search history.

(56) References Cited

U.S. PATENT DOCUMENTS

| | | | |
|---|---|---|---|
| 10,471,719 B2 * | 11/2019 | Toda | B41J 2/1637 |
| 10,525,711 B2 * | 1/2020 | Amma | B41J 2/1603 |
| 10,532,574 B2 * | 1/2020 | Iwano | B41J 2/1603 |
| 2007/0057401 A1 * | 3/2007 | Dooley | B29C 45/1635 |
| | | | 264/161 |
| 2015/0174800 A1 * | 6/2015 | Imamura | B41J 2/1637 |
| | | | 156/245 |
| 2015/0328810 A1 * | 11/2015 | Kawamura | B29C 45/02 |
| | | | 428/35.7 |
| 2016/0221295 A1 * | 8/2016 | Roychoudhury | B29C 45/32 |
| 2016/0346967 A1 | 12/2016 | Oikawa et al. | |
| 2016/0346968 A1 | 12/2016 | Kimura et al. | |
| 2016/0346969 A1 | 12/2016 | Toda et al. | |
| 2016/0346970 A1 | 12/2016 | Oikawa et al. | |
| 2016/0346971 A1 | 12/2016 | Iwano et al. | |
| 2016/0346976 A1 | 12/2016 | Tsujiuchi et al. | |
| 2016/0347072 A1 | 12/2016 | Iwano et al. | |
| 2017/0368728 A1 * | 12/2017 | Oikawa | B29C 45/0062 |
| 2018/0029266 A1 * | 2/2018 | Tsujiuchi | B29C 45/1635 |
| 2018/0029267 A1 * | 2/2018 | Tsujiuchi | B41J 2/1753 |
| 2018/0141247 A1 * | 5/2018 | Nagai | B41J 2/1603 |

FOREIGN PATENT DOCUMENTS

| | | |
|---|---|---|
| JP | 5-084771 A | 4/1993 |
| JP | 2002-079542 A | 3/2002 |
| JP | 2007-245421 A | 9/2007 |
| JP | 2007-320250 A | 12/2007 |
| JP | 2012192749 A * | 10/2012 |
| JP | 2015-214125 A | 12/2015 |
| JP | 2016-215561 A | 12/2016 |

* cited by examiner

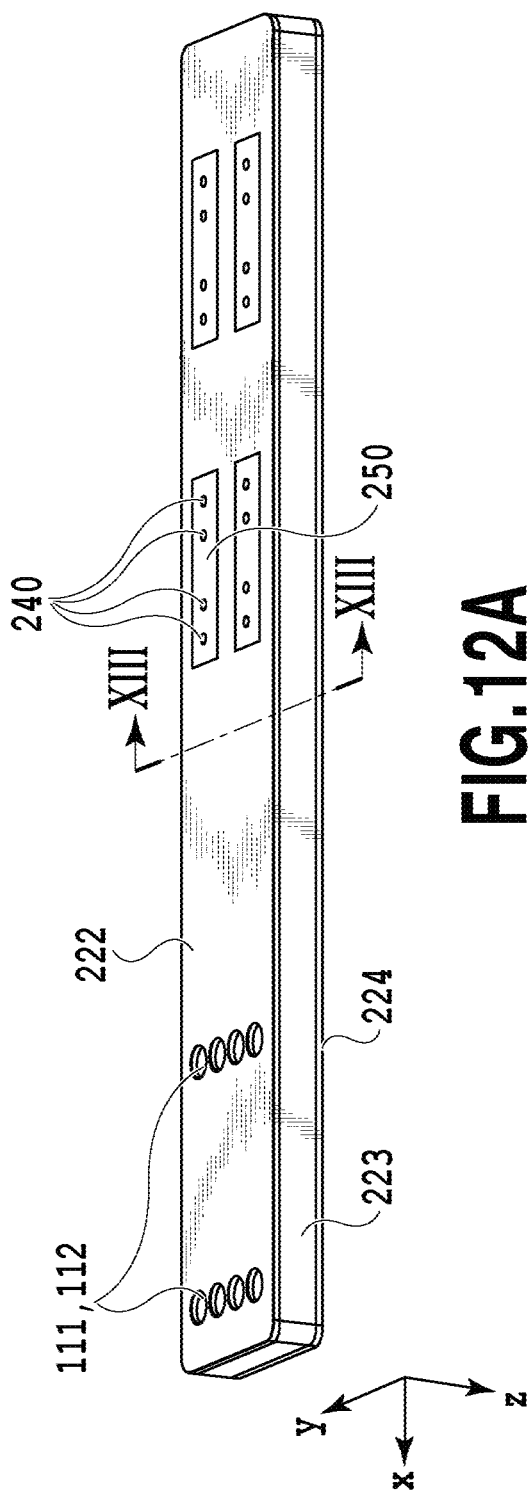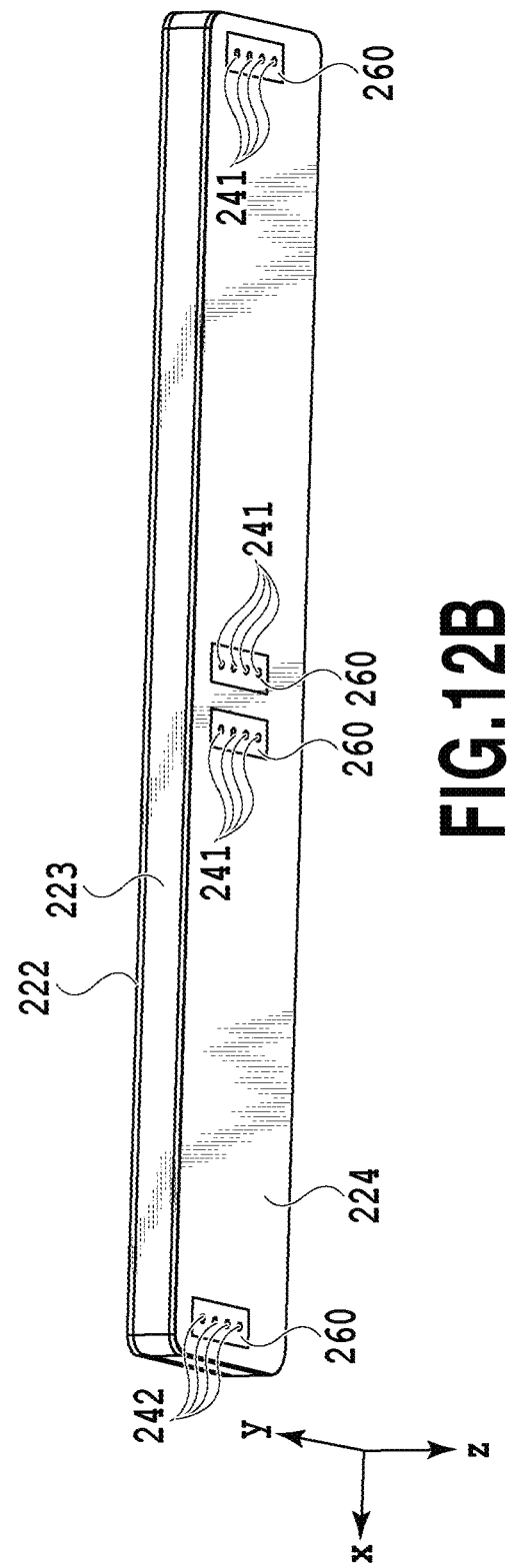
FIG.12A
FIG.12B

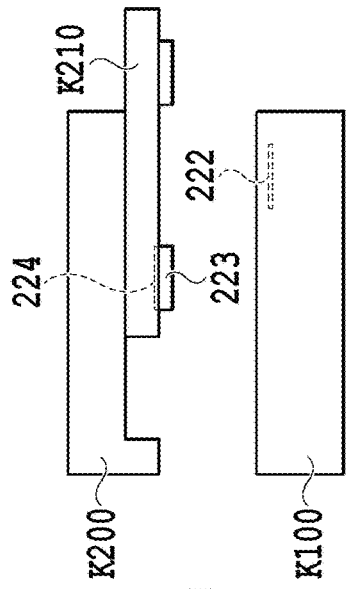
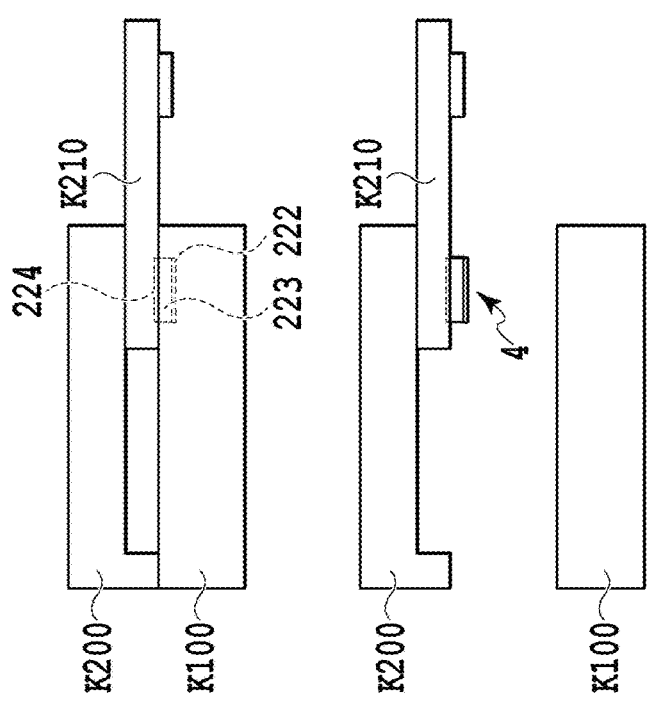
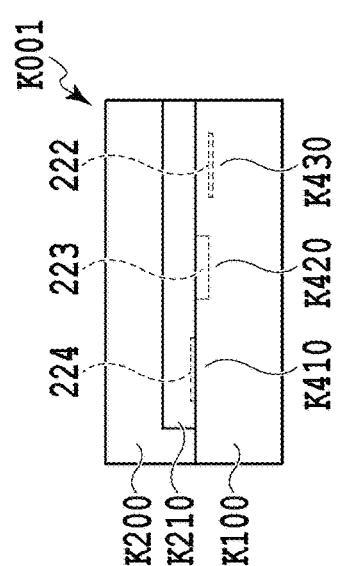
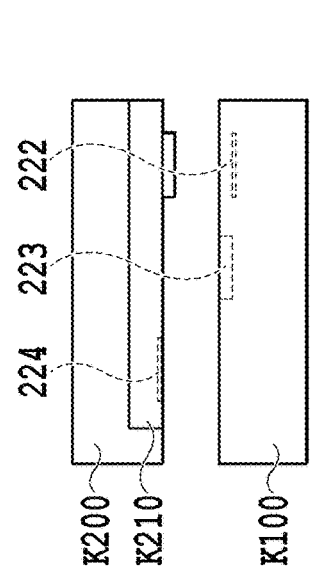
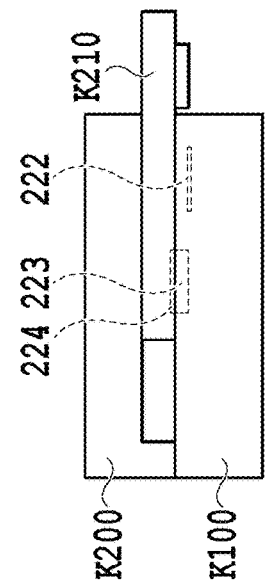
FIG.14A  FIG.14B  FIG.14C  FIG.14D  FIG.14E  FIG.14F

METHOD OF MANUFACTURING LIQUID SUPPLY UNIT

BACKGROUND OF THE INVENTION

Field of the Invention

The present invention relates to a method of manufacturing a liquid supply unit used in an inkjet printing apparatus and the like.

Description of the Related Art

An inkjet printing apparatus requires a passage configuration in order to supply a liquid to a liquid ejecting head from a reservoir tank that reserves a liquid such as an ink. Japanese Patent Laid-Open No. 2007-245421 discloses a method of forming a high-accuracy passage configuration by manufacturing an inflow portion, a passage portion, and an outflow portion individually with photolithography and etching techniques, and then stacking and bonding these portions to one another.

Such an ink supply passage as disclosed in Japanese Patent Laid-Open No. 2007-245421 is effective as a supply passage in a region located very close to a printing head. However, in the case of a flat plate-shaped liquid supply unit such as one in a full-line inkjet printing apparatus for guiding a relatively large volume of a liquid to a wide range, resin molding seems to be preferred in light of the cost and the like.

The resin molding of a flat plate-shaped liquid supply unit provided with a passage structure inside requires a process to individually form multiple layers each having upper and lower surfaces by use of resin and then to stack the layers. However, in the case of the resin molding, a certain level of undulation or warpage inevitably occurs in each layer due to demolding or shrinkage during the process. Hence, there is a risk that each of the layers is further deformed when the layers are stacked and bonded to one another.

The liquid supply unit for guiding a relatively large volume of a liquid to a wide range is preferably formed into the flat plate shape having the same width as that of the printing head and a substantially even thickness so as to supply the liquid evenly to numerous nozzles arranged in a width direction of a printing medium. However, if a portion of the liquid supply unit to be connected to another component located on an upstream side or a downstream side is deformed, an elastic member located at the portion cannot follow the deformation, thereby causing leakage of a gas or the liquid.

SUMMARY OF THE INVENTION

The present invention has been made in order to solve the aforementioned problem. Accordingly, an object of the invention is to manufacture a flat plate-shaped liquid supply unit having a high degree of flatness by resin molding.

According to a first aspect of the present invention, there is provided a method of manufacturing a liquid supply unit configured to supply a liquid to a liquid ejecting head, comprising: a first molding step of injecting a resin into different positions inside a disassemblable mold assembly in a clamped state to mold, at the different locations, respectively, a first member including a first contact portion to be connected to another component, a second member including a second contact portion to be connected to still another component, and an intermediate passage member to be located between the first member and the second member and including a passage structure to connect the first contact portion to the second contact portion; and a second molding step of bonding the first member, the second member, and the intermediate passage member to one another by disassembling the mold assembly into pieces after the first molding step, moving a die slide mold disposed inside the mold assembly in a different direction from a direction in which the mold assembly is disassembled to perform positioning among the first member, the second member, and the intermediate passage member in the moving direction, clamping the mold assembly again, and injecting a resin into the mold assembly, wherein the first contact portion and the second contact portion are respectively held on the same surfaces inside the mold assembly during a period from the first molding step to completion of the second molding step.

According to a second aspect of the present invention, there is provided a method of manufacturing a liquid supply unit configured to supply a liquid to a liquid ejecting head, comprising: a first molding step of, in a state of clamping a mold assembly including a fixed mold and a movable mold detachable in a first direction from the fixed mold, injecting a resin into different positions inside the mold assembly to mold, at the different locations, respectively, a first member including a first contact portion to be connected to another component, a second member including a second contact portion to be connected to still another component, and an intermediate passage member to be located between the first member and the second member and including a passage structure to connect the first contact portion to the second contact portion; a first moving step of detaching the movable mold in the first direction from the fixed mold after the first molding step, and performing positioning between the intermediate passage member and the first member in a second direction different from the first direction by moving a die slide mold held by the movable mold in the second direction; a second molding step of bonding the intermediate passage member to the first member after the first moving step by injecting a resin into the mold assembly in the state of clamping the fixed mold and the movable mold together; a second moving step of detaching the movable mold in the first direction from the fixed mold after the second molding step, and performing positioning between the intermediate passage member and the second member in the second direction by moving the die slide mold in the second direction; and a third molding step of bonding the intermediate passage member to the second member after the second moving step by injecting a resin into the mold assembly in the state of clamping the fixed mold and the movable mold together, wherein the first contact portion is held on the die slide mold and the second contact portion is held on the same surface of the fixed mold during a period from the first molding step to completion of the third molding step.

Further features of the present invention will become apparent from the following description of exemplary embodiments with reference to the attached drawings.

BRIEF DESCRIPTION OF THE DRAWINGS

FIGS. 12A and 12B are external perspective views of a liquid supply unit;

FIGS. 14A to 14F are diagrams showing a molding process for the liquid supply unit.

DESCRIPTION OF THE EMBODIMENTS (Description of Inkjet Printing Apparatus)

Figure 1:
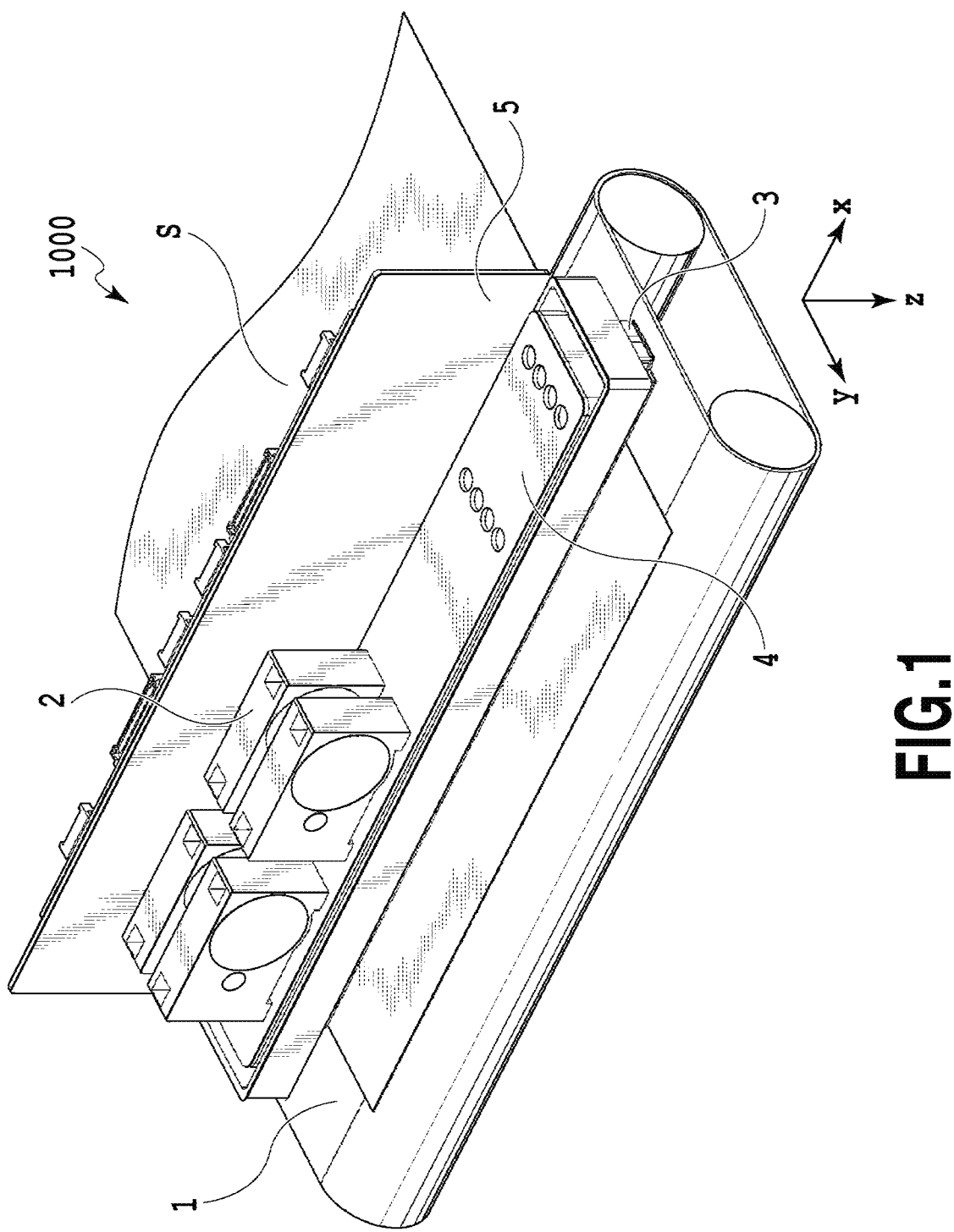
FIG. 1 is a schematic diagram of an internal configuration of an inkjet printing apparatus.

FIG. 1 is a schematic diagram of an internal configuration of an inkjet printing apparatus 1000 usable as a liquid ejecting apparatus of the present invention. A conveyance unit 1 conveys a sheet S serving as a printing medium in y direction at a constant velocity. A liquid ejecting head 3 ejects an ink in z direction onto the conveyed sheet S in accordance with printing data. The liquid ejecting head 3 of this embodiment is a full-line type inkjet printing head configured such that multiple nozzles to eject the ink of the same color (the liquid of the same type) are arranged in x direction for a distance corresponding to a width of the sheet S. Moreover, such nozzle arrays containing inks of cyan, magenta, yellow, and black, respectively, are arranged in parallel in the y direction. Data and electric power necessary for ejecting actions are supplied from an electric wiring unit 5. Note that the sheet S may be a cut sheet or a rolled sheet.

A liquid supply unit 4 for receiving the inks from a not-illustrated tube and to supply the inks to the liquid ejecting head 3 is installed above the liquid ejecting head 3 in the direction of gravity (−z direction). Moreover, negative pressure regulating units 2 for regulating pressures of the inks to be supplied to the liquid ejecting head 3 are installed above the liquid supply unit 4. Each of the negative pressure regulating units 2 is prepared for each of the colors, so that the negative pressures in the liquid ejecting head 3 can be regulated independently depending on the ink colors.

(Explanation of Circulation Passage)

Figure 2:
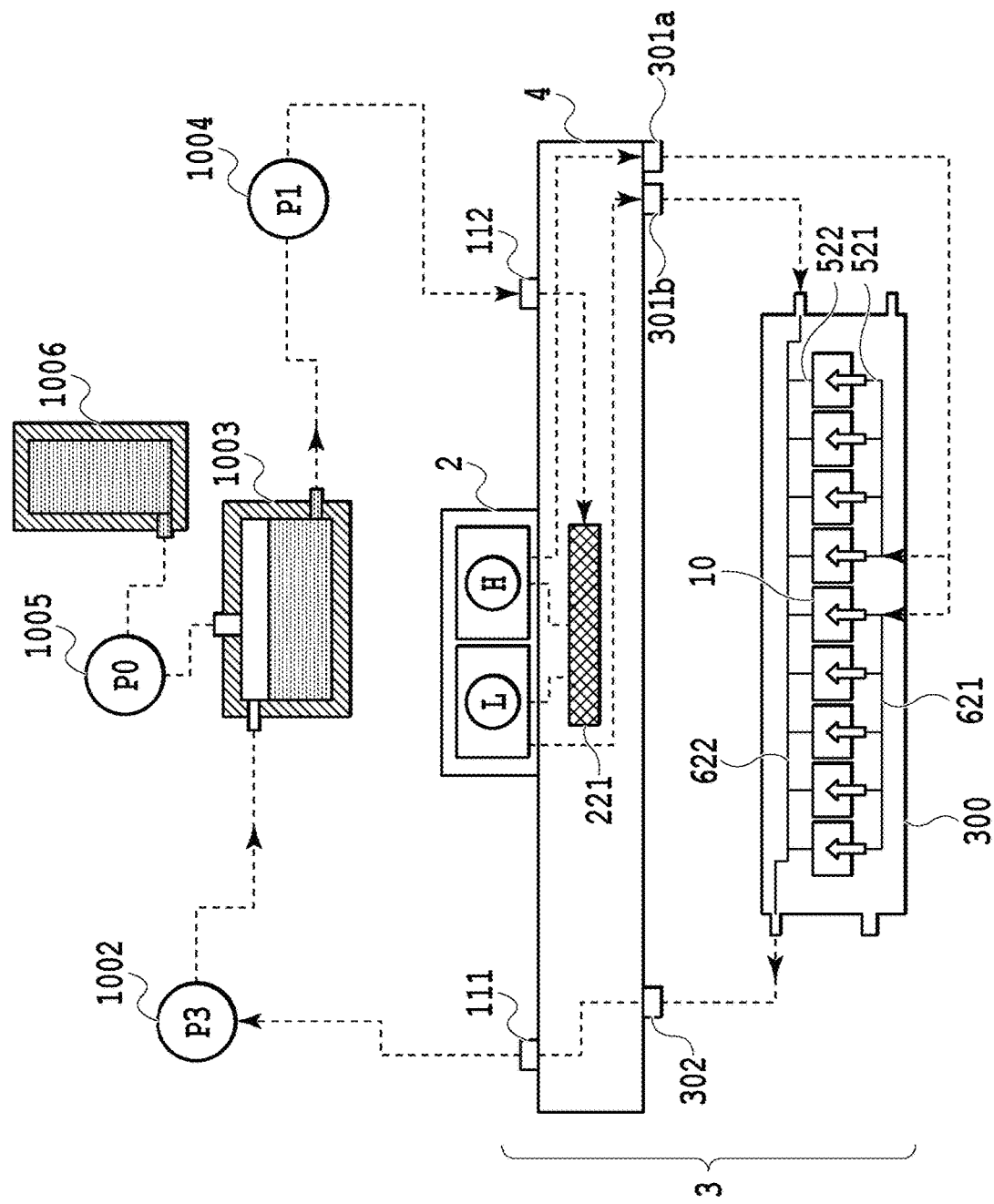
FIG. 2 is a diagram showing a liquid circulation passage in the inkjet printing apparatus.

FIG. 2 is a diagram showing a liquid circulation passage in the inkjet printing apparatus 1000. While a circulation passage for the ink of a certain color is illustrated herein, similar circulation passages for the respective ink colors of C, M, Y, and K are prepared in the actual printing apparatus. A buffer tank 1003 is connected to a first circulation pump 1002 and a second circulation pump 1004, and the ink is fed in a direction from the left to the right in FIG. 2 by operations of these pumps. Meanwhile, when the amount of the ink in the buffer tank 1003 gets low, a refilling pump 1005 is operated to supply the ink from a large-volume main tank 1006, which is fixed to the inside of the apparatus. The buffer tank 1003 is provided with an atmosphere communication port, so that bubbles flowing in the liquid circulation passage can be discharged therefrom.

The ink flowing out of the liquid supply unit 4 through an outflow connector 111 is guided to the buffer tank 1003 by the first circulation pump 1002. The second circulation pump 1004 supplies the ink reserved in the buffer tank 1003 to the liquid supply unit 4 through an inflow connector 112. Installation of the second circulation pump 1004 makes it possible to maintain a flow pressure inside the liquid ejecting head 3 within a predetermined range in case of a sudden decrease of the ink in the buffer tank 1003 attributed to high-density printing or recovery processing for the liquid ejecting head 3.

The liquid supply unit 4 removes foreign matters from the ink taken in through the inflow connector 112 by using a filter 221, and then supplies the ink to the negative pressure regulating unit 2. A negative pressure regulating subunit H configured to release the ink at a high pressure and a negative pressure regulating subunit L configured to release the ink at a low pressure are arranged in parallel in the negative pressure regulating unit 2. Then, the ink released from the negative pressure regulating subunit H is supplied to a liquid ejecting unit 300 in the liquid ejecting head 3 through an inflow port 301a, while the ink released from the negative pressure regulating subunit L is supplied thereto through an inflow port 301b, respectively. Installation of the above-described negative pressure regulating unit 2 makes it possible to maintain a flow pressure in the liquid ejecting unit 300, which is located downstream of the negative pressure regulating unit 2, within a certain range even if a flow rate in the circulation system fluctuates due to a change in printing duty.

The liquid ejecting unit 300 is provided with a common supply passage 621 in which the ink flows at the high pressure owing to the negative pressure regulating subunit H, and a common collection passage 622 in which the ink flows at the low pressure owing to the negative pressure regulating subunit L. Moreover, in the liquid ejecting unit 300, a plurality of printing element substrates 10 each formed by arranging multiple nozzles in the x direction are further connected to each other in the x direction. In addition, each printing element substrate 10 is provided with an individual supply passage 521 to be connected to the common supply passage 621, and an individual collection passage 522 to be connected to the common collection passage 622. Accordingly, a flow of the ink is created in each printing element substrate 10 due to a difference in flow pressure between the common supply passage 621 and the common collection passage 622. Specifically, the ink flows from the common supply passage 621 having the high pressure through the individual supply passage 521, and the ink flows out to the common collection passage 622 through the individual collection passage 522.

When each printing element substrate 10 performs an ejecting operation, part of the circulating ink is consumed by ejection and the remaining ink is passed through the individual collection passage 522 and the common collection passage 622, and is discharged from an outflow port 302 to the liquid supply unit 4. The ink flowing out of the outflow port 302 to the liquid supply unit 4 is sent toward the first circulation pump 1002 through the outflow connector 111.

In the liquid ejecting head using the above-described circulation supply circuit, heat generated by the ejecting operations of the printing element substrates 10 is absorbed by the flowing liquid. Thus, it is possible to suppress ejection failures attributed to heat storage even when the ejecting operations are continuously performed. In addition, a thickened ink or a foreign matter is less likely to remain in the vicinity of a nozzle with a low ejecting frequency. Thus, it is possible to stabilize the state of ejection of every nozzle.

However, if a flow velocity is set too high in order to obtain the aforementioned effect, a pressure loss in the liquid ejecting unit 300 is likely to cause differences in pressure among the printing element substrates 10, which may result in variations in the state of ejection to invite density unevenness and the like. Accordingly, a flow rate of discharge from the first circulation pump 1002 is preferably regulated to the extent such that neither differences in temperature nor differences in pressure among the plurality of printing element substrates 10 affects a printed image. Specific examples of the first circulation pump 1002 include positive displacement pumps having a quantitative liquid pumping capacity such as a tube pump, a gear pump, a diaphragm pump, and a syringe pump. Alternatively, it is also possible to secure a constant flow rate by disposing a general constant flow rate value or a general relief valve at an outlet of the pump.

On the other hand, the second circulation pump 1004 only needs to have a lifting pressure that is equal to or above a certain pressure in a range of an ink circulation flow rate used during the drive, so that a turbo pump or a positive displacement pump may be used. Specific examples thereof include a diaphragm pump and the like. Alternatively, the second circulation pump may be replaced by a water head tank disposed in such a way as to establish a certain water head difference from a negative pressure regulating unit, for example.

The two subunits H and L provided in the negative pressure regulating unit 2 may adopt a mechanism similar to a so-called "pressure reducing regulator". When the pressure reducing regulators are used, it is preferable to apply a pressure to the upstream side of the negative pressure regulating unit 2 through the liquid supply unit 4 by using the second circulation pump 1004 as shown in FIG. 2. In this way, it is possible to suppress an effect of the water head pressure from the buffer tank 1003 to the liquid ejecting head 3, and thus to increase the freedom of layout of the buffer tank 1003 in the printing apparatus 1000.

(Explanation of Configuration of Liquid Ejecting Head)

Figure 3A:
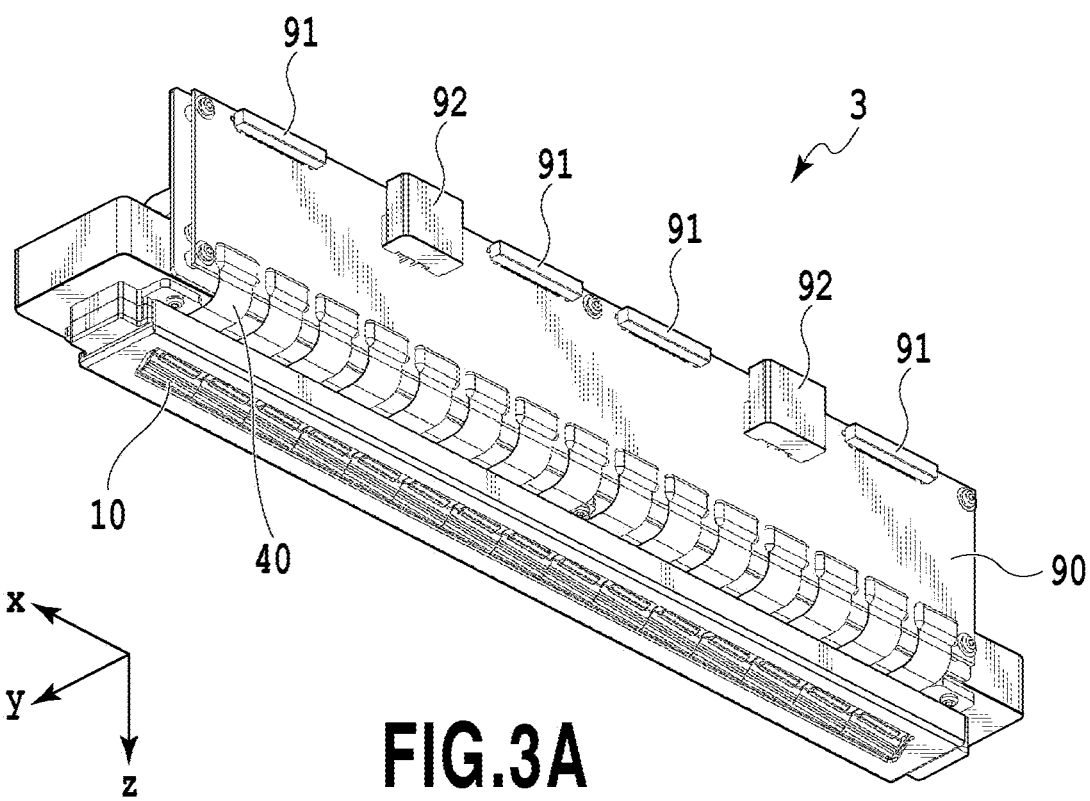
FIGS. 3A and 3B are external perspective views of a liquid ejecting head.
Figure 3B:
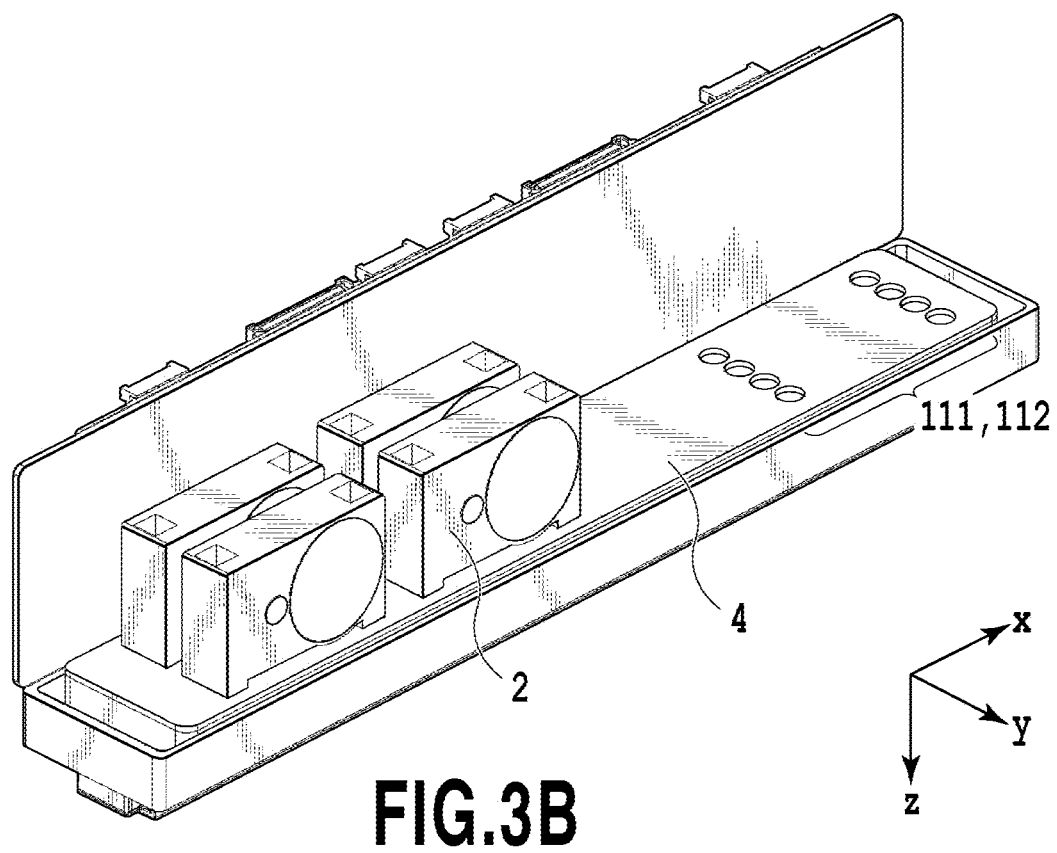

FIGS. 3A and 3B are external perspective views of the liquid ejecting head 3. The liquid ejecting head 3 of this embodiment is a full-line type color inkjet printing head covering the entire width of the sheet S. Fifteen printing element substrates 10 are arranged in the x direction and the respective printing element substrates 10 eject the inks of four colors, namely, cyan, magenta, yellow, and black in the z direction in accordance with ejection data.

The ejection data and the electric power for ejecting actions are inputted to signal input terminals 91 and power supply terminals 92 provided to an electric wiring substrate 90, and are supplied to the respective printing element substrates 10 through flexible wiring substrates 40. In this embodiment, the wiring is consolidated into electric circuits in the electric wiring substrate 90. Thus, the numbers of the signal input terminals 91 and the power supply terminals 92 are made fewer than the number (fifteen) of the printing element substrates 10. In other words, it is possible to reduce the number of times of attachment and detachment of electric connectors in association with assembly and replacement of the liquid ejecting head 3 with respect to the printing apparatus 1000.

Meanwhile, as described with reference to FIG. 2, the ink to be ejected from each printing element substrate 10 is fed into the liquid supply unit 4 through the inflow connector 112, then subjected to regulation of its flow pressure by the negative pressure regulating unit 2, and supplied to the liquid ejecting unit 300. Then, the ink not consumed by the ejection is discharged from the liquid ejecting head 3 again through the outflow connector 111. FIG. 3B shows the inflow connectors 112 corresponding to the inks of four colors and the outflow connectors 111 used for discharge of the inks. Tubes to communicate with various pumps are connected to the inflow connectors 112 and the outflow connectors 111, respectively.

Figure 4:
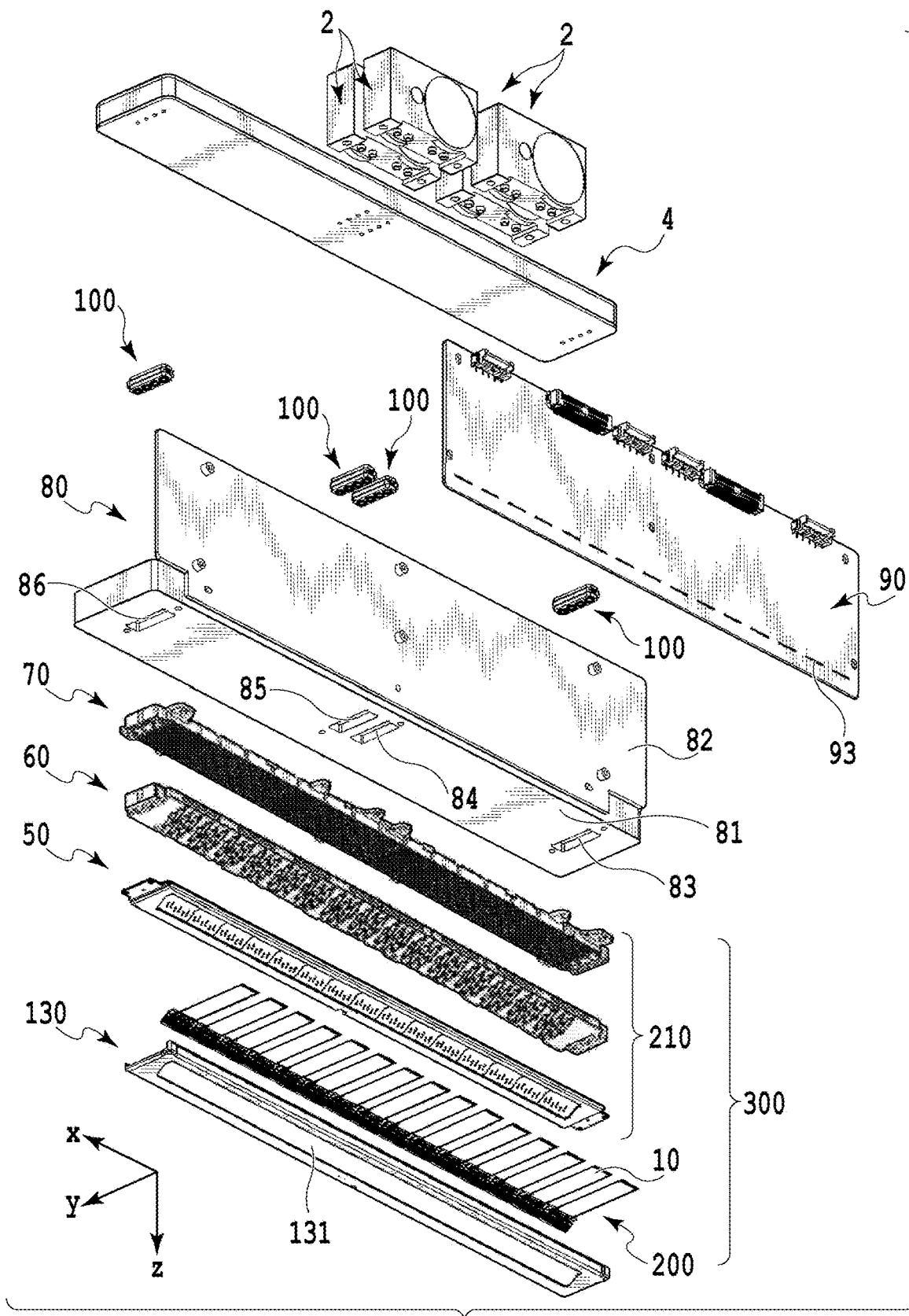
FIG. 4 is an exploded perspective view of the liquid ejecting head.

FIG. 4 is an exploded perspective view of the liquid ejecting head 3. The liquid ejecting head 3 is formed by attaching the liquid ejecting unit 300 from the +z direction side to a housing 80 provided in order to secure head rigidity, and attaching the liquid supply unit 4 and the negative pressure regulating unit 2 from the −z direction side to the housing 80 in this order. The electric wiring substrate 90 is fixed with screws to the −y direction side of the housing 80 together with an electric wiring substrate support 82. The liquid ejecting unit 300 is attached to the +z direction side of the housing 80 through a liquid ejecting unit support 81. Here, a passage member 210 that includes three layers of submembers, an ejecting module 200 that includes the fifteen printing element substrates 10, and a cover member 130 that covers the outer periphery of the aforementioned components are stacked in the z direction, thereby forming the liquid ejecting unit 300.

The negative pressure regulating units 2 are provided independently for the respective inks of four colors. The negative pressure regulating subunit H and the negative pressure regulating subunit L described with reference to FIG. 2 are arranged in parallel in each negative pressure regulating unit 2. Each of the negative pressure regulating subunit H and the negative pressure regulating subunit L regulates the flow pressure to a preset range by using a pressure regulation valve formed of a value, a spring member, and the like provided inside. Due to the function of the pressure regulation valve, even if a change in pressure loss associated with fluctuation of the flow rate of the liquid occurs in a supply system (a supply system on the upstream side of the liquid ejecting head 3), the pressure on the liquid ejecting unit 300 side located downstream of the pressure regulating unit 2 is stabilized within a predetermined range.

The negative pressure regulating units 2 for the four colors are connected in common to the liquid supply unit 4 that extends in the x direction by a distance corresponding to a width of arrangement of the liquid ejecting unit 300. Accordingly, the liquid supply unit 4 is provided with the outflow connectors 111, the inflow connectors 112, and the filters 221 shown in FIG. 2 for the four colors, respectively. The configuration of the liquid ejecting unit 300 and a manufacturing method thereof will be described later in detail.

The housing 80 plays a role in correcting a warpage of the liquid ejecting unit 300 with a high degree of accuracy, and thus securing positional accuracy of the printing element substrates 10. For this reason, the housing 80 preferably has sufficient rigidity. Suitable materials therefor include metallic materials such as SUS and aluminum, and ceramics such as alumina. Openings 83 to 86 to allow insertion of rubber joints 100 are provided at a bottom of the housing 80. The liquid flows in and out between the liquid supply unit 4 and the liquid ejecting unit 300 through the rubber joints 100.

The ejecting module 200 formed of the fifteen printing element substrates 10 has a configuration to eject the inks in the form of droplets, while the passage member 210 is configured to guide the liquid supplied from the liquid supply unit 4 to the individual printing element substrates 10 and further to the individual nozzles therein. The passage member 210 and the ejecting module 200 will be described later in detail.

The cover member 130 has an elongated opening 131 to expose ejecting port surfaces of the printing element substrates 10. A frame around the opening 131 comes into contact with a rubber cap member at the time of protecting the ejecting port surface of the liquid ejecting head 3 and performing suction recovery processing. When manufacturing the liquid ejecting head 3, an adhesive, a sealing material, and a filler are coated on an inner side of the frame and the coated surface are caused to adhere to the ejecting module 200. Thus, it is possible to enhance the degree of adhesion to the cap member and to improve the effects of the protection of the ejecting port surfaces and the recovery processing.

Figure 5A:
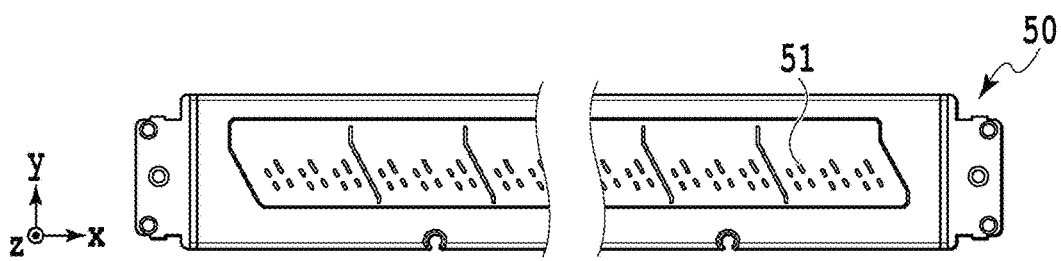
FIGS. 5A to 5F are diagrams for explaining a detailed configuration of a passage member.
Figure 5B:
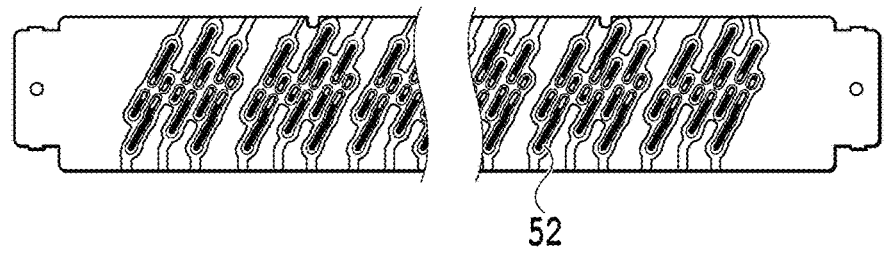
Figure 5C:
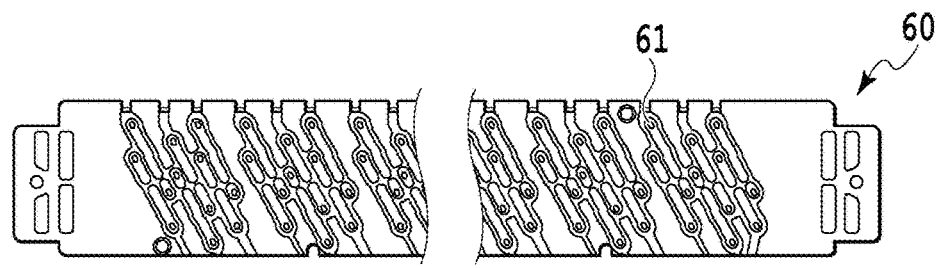
Figure 5D:
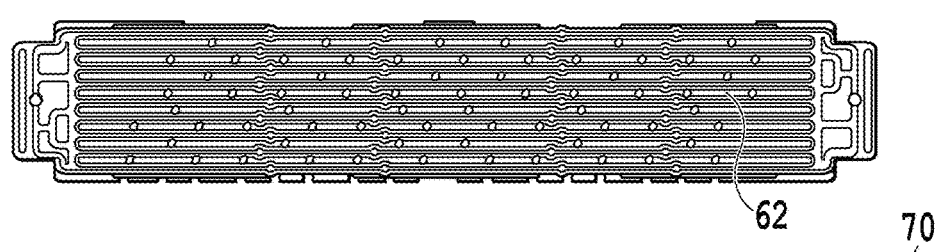
Figure 5E:
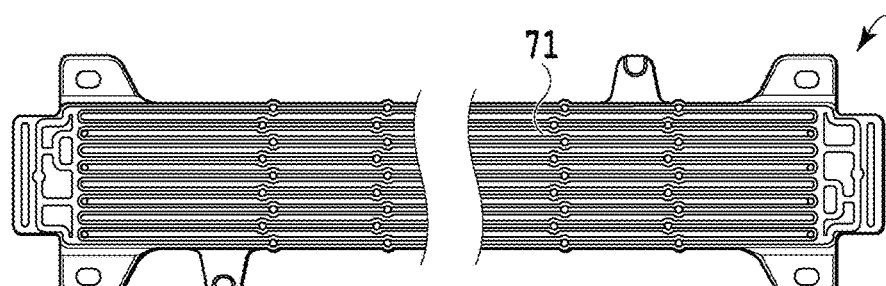
Figure 5F:
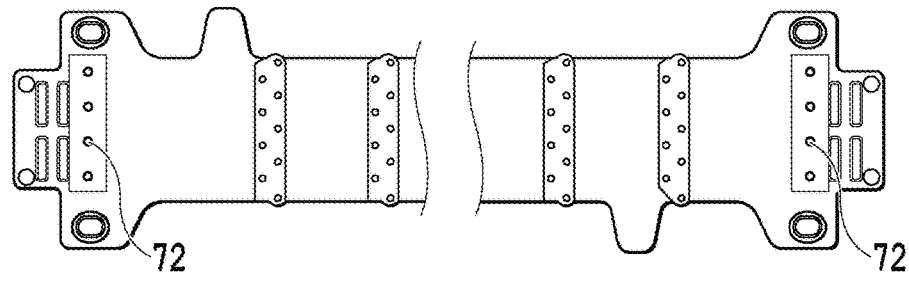

FIGS. 5A to 5F are diagrams for explaining a detailed configuration of the passage member 210. FIGS. 5A and 5B illustrate front and back surfaces of a first passage submember 50, FIGS. 5C and 5D illustrate front and back surfaces of a second passage submember 60, and FIGS. 5E and 5F illustrate front and back surfaces of a third passage submember 70, respectively. FIG. 5A represents a contact surface with the ejecting module 200, and FIG. 5F represents a contact surface with the liquid supply unit 4. In the meantime, the surface of the first passage submember 50 shown in FIG. 5B comes into contact with the surface of the second passage submember 60 shown in FIG. 5C, and the surface of the second passage submember 60 shown in FIG. 5D comes into contact with the surface of the third passage submember 70 shown in FIG. 5E.

These passage submembers realize a passage configuration for guiding the inks supplied from the liquid supply unit 4 to the respective printing element substrates 10 of the ejecting module 200, and a passage configuration for taking the inks not consumed by the respective printing element substrates 10 back to the liquid supply unit 4. The above-described passage member 210 is fixed with screws to the liquid ejecting unit support 81 located at the bottom of the housing 80, and is thus prevented from warpage and deformation.

Multiple communication ports 72 are formed in the surface (FIG. 5F) of the third passage submember 70 coming into contact with the liquid supply unit 4 at positions corresponding to the inflow ports 301a and 301b and the outflow ports 302 of the liquid supply unit 4 described with reference to FIG. 2. The communication ports 72 penetrate to the back surface side (FIG. 5E), and common passage grooves 71 that extend in the x direction are formed on the back surface side. In FIG. 5E, four grooves out of the eight common passage grooves 71 are the common passage grooves 71 connected to the inflow ports 301a and 301b for the respective ink colors while the remaining four grooves are the common passage grooves 71 connected to the outflow ports 302 for the respective ink colors. Based on the above-described configuration, the inks supplied from the communication ports 72 as the inflow ports spread in the x direction along the common passage grooves 71 on the back surface.

Common passage grooves 62 that extend in the x direction are formed in the surface (FIG. 5D) of the second passage submember 60 coming into contact with the surface of the third passage submember 70 shown in FIG. 5E at positions corresponding to the common passage grooves 71 formed in the third passage submember 70. Moreover, communication ports 61 that penetrate to the back surface side (FIG. 5C) are formed at several positions along the x direction of each common passage groove 62. Based on the above-described configuration, part of the inks spreading in the common passage grooves 71 and 62 move to the back surface side (FIG. 5C) of the second passage submember 60.

Individual passage grooves 52 for guiding the inks from the communication ports 61 formed in the second passage submember 60 to positions where the nozzle arrays corresponding to the respective ink colors are provided are formed in the surface (FIG. 5B) of the first passage submember 50 coming into contact with the surface of the second passage submember 60 shown in FIG. 5C. Communication ports 51 that penetrate to the back surface side (FIG. 5A) are formed at end portions of the respective individual passage grooves 52 opposite from the communication ports 61. Based on the above-described configuration, the inks flowing in from the communication ports 61 travel along the individual passage grooves 52 and move to the surface (FIG. 5A) of the first passage submember 50 through the communication ports 51, which is opposed to the ejecting module 200, thereby supplying the inks to the ejecting module 200. On the other hand, the inks not consumed by the ejecting module 200 return to the communication ports 72 of FIG. 5F via passages that are reverse of the aforementioned passages, and flow out of to the liquid supply unit 4.

Each of the first passage submember 50, the second passage submember 60, and the third passage submember 70 is preferably made of a material having sufficient corrosion resistance against the liquids (the inks) and having a low linear expansion coefficient. Examples of suitably usable materials include alumina and a resin material, or more specifically, a liquid crystal polymer (LCP) or polyphenyl sulfide (PPS). Another example of the suitable material is a composite material formed by adding an inorganic filler such as fine particles of silica or fibers to polysulfone (PSF) or modified polyphenylene ether (PPE) serving as a matrix. The first passage submember 50, the second passage submember 60, and the third passage submember 70 may be attached to one another when forming the passage member 210. However, when a resin composite material is selected as the material, then the passage submembers may also be bonded to one another by welding.

Figure 6:
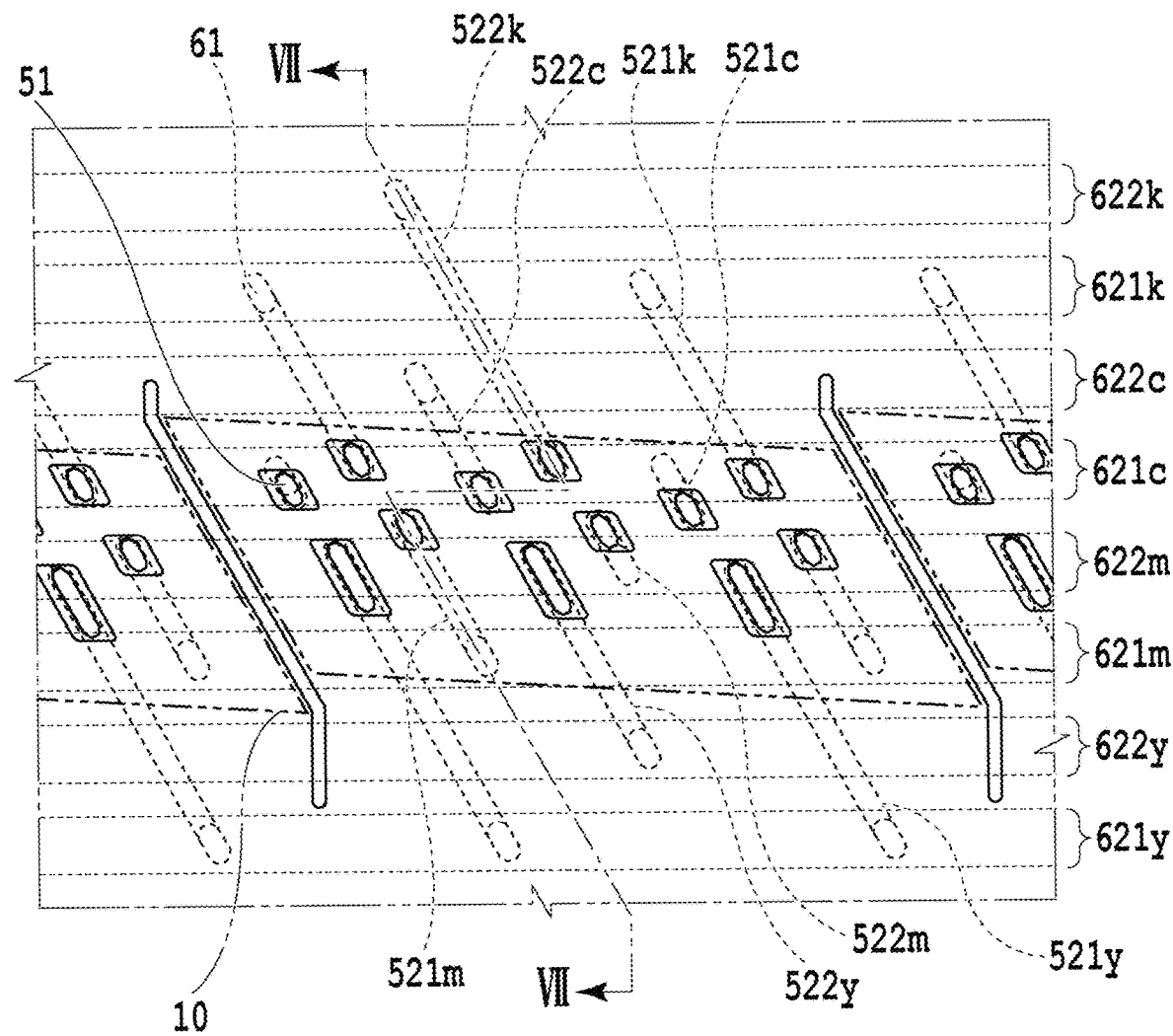
FIG. 6 is a transparent perspective view of the liquid ejecting head.

FIG. 6 is a transparent perspective view of the first passage submember 50, the second passage submember 60, and the third passage submember 70 when the passage member 210 is observed from the −z direction. Here, the passage grooves used for the ink supply out of the eight common passage grooves 62 (71) shown in FIGS. 5D and 5E are denoted by 621k, 621c, 621m, and 621y corresponding to the respective inks. Meanwhile, the passage grooves used for the ink collection are denoted by 622k, 622c, 622m, and 622y corresponding to the respective inks. In addition, the passage grooves used for the ink supply out of the individual passage grooves 52 shown in FIG. 5B are denoted by 521k, 521c, 521m, and 521y while those used for the ink collection are denoted by 522k, 522c, 522m, and 522y. As described above, regarding the communication ports 72, the common passage grooves 71 and 62, the communication ports 61, the individual passage grooves 52, and the communication ports 51, an inflow passage and an outflow passage are prepared independently for each ink color.

Figure 7:
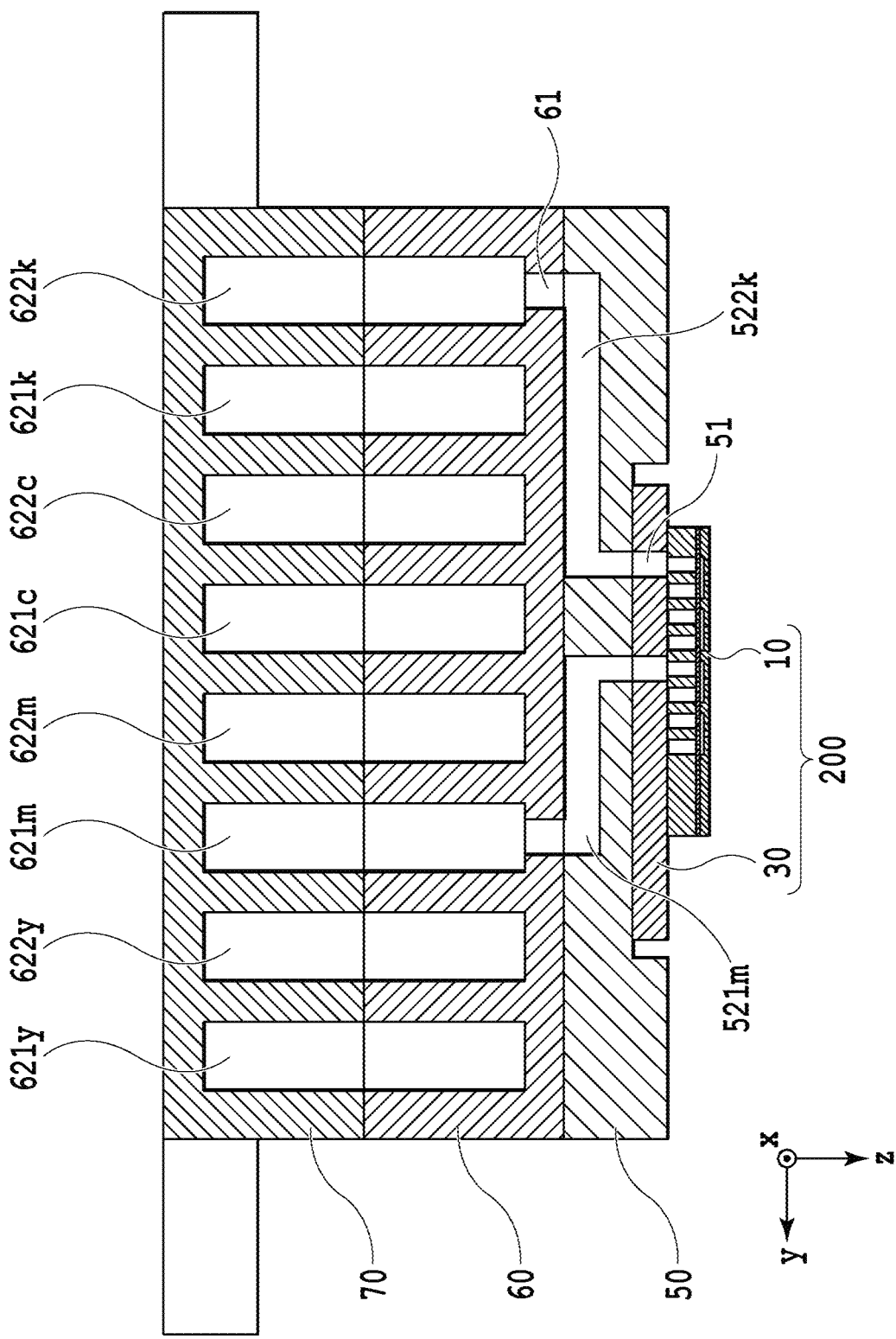
FIG. 7 is a cross-sectional view of the liquid ejecting head.

FIG. 7 is a cross-sectional view taken along the VII-VII line in FIG. 6. The common supply passages 621k, 621c, 621m, and 621y for the ink supply as well as the common collection passages 622k, 622c, 622m, and 622y for the ink collection are formed by overlaying the third passage submember 70 and the second passage submember 60. The common collection passage 622*k* for collecting the black ink (K) and the common supply passage 621*m* for supplying the magenta ink (M) are connected to the individual collection passage 522*k* for the ink collection and the individual supply passage 521*m* formed in the first passage submember 50, respectively. FIG. 7 also illustrates cross sections of the common supply passages 621 and the common collection passages 622 in the printing element substrate 10 described with reference to FIG. 2. The individual collection passage 522*k* for the black ink (K) is connected to the common collection passage 622*k* for the black ink (K), while the individual supply passage 521*m* for the magenta ink (M) is connected to the common supply passage 621*m* for the magenta ink (M).

According to the configuration described above, in the liquid ejecting unit 300 of this embodiment, each ink flows in the order of the common supply passage 621, the individual supply passage 521, the printing element substrate 10, the individual collection passage 522, and the common collection passage 622. Thus, it is possible to maintain the ink circulation described with reference to FIG. 2 smoothly. Note that the order of arrangement of the passage grooves for the black, cyan, magenta, and yellow in the y direction shown in FIGS. 6 and 7 is just one example, and other orders of arrangement are also applicable.

Figure 8A:
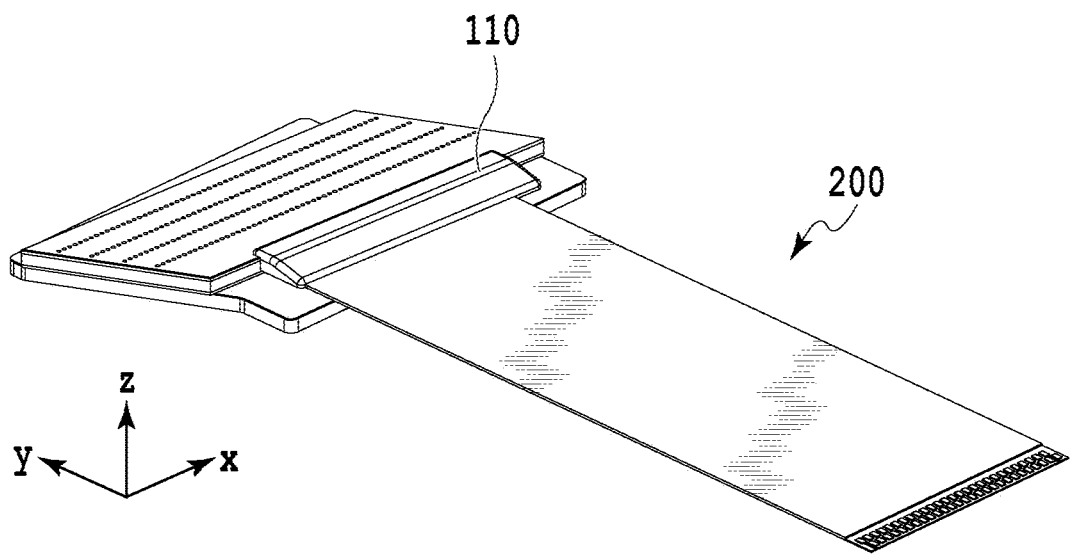
FIGS. 8A and 8B are perspective views and an exploded diagram of an ejecting module.
Figure 8B:
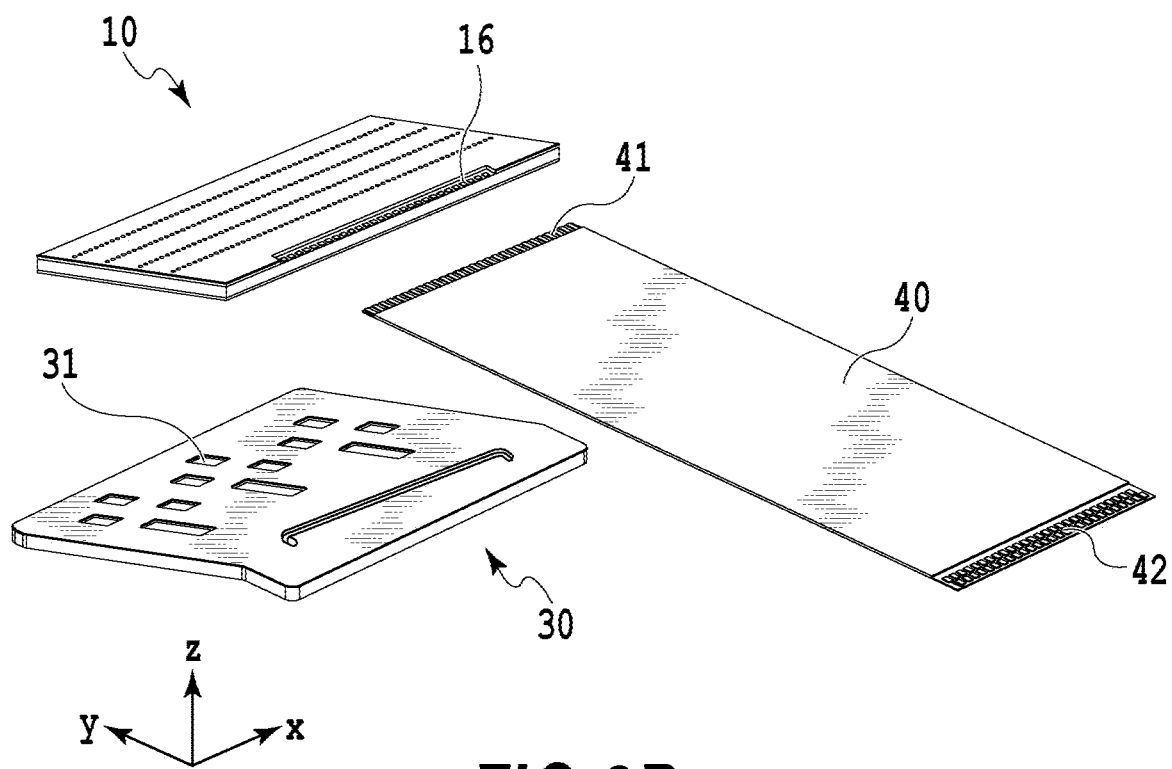

FIGS. 8A and 8B are perspective views and an exploded diagram of the ejecting module 200. In the ejecting module 200, each printing element substrate 10 is attached onto a support member 30. Further, a terminal 16 on the printing element substrate 10 is electrically connected to a terminal 41 of the flexible wiring substrate 40 by wire bonding, and the wire-bonded part is sealed with a sealing material 110. A terminal 42 of the flexible wiring substrate 40 located at an opposite position from the part connected to the printing element substrate 10 is electrically connected to a corresponding connection terminal 93 of the electric wiring substrate 90 (see FIGS. 3A and 4). Liquid communication ports 31 to be connected to the common supply passage 621 and the common collection passage 622 described with reference to FIG. 2 are formed in the support member 30 at positions corresponding to the communication ports 51 in the first passage submember 50. The support member 30 is a support for the printing element substrate 10 and is also a passage member located between the printing element substrate 10 and the passage member 210 at the same time. For this reason, the support member 30 is preferably a member having a high degree of flatness so as to be bonded to the printing element substrate 10 with high reliability. Examples of suitably usable materials therefor include alumina and a resin material.

Figure 9A:
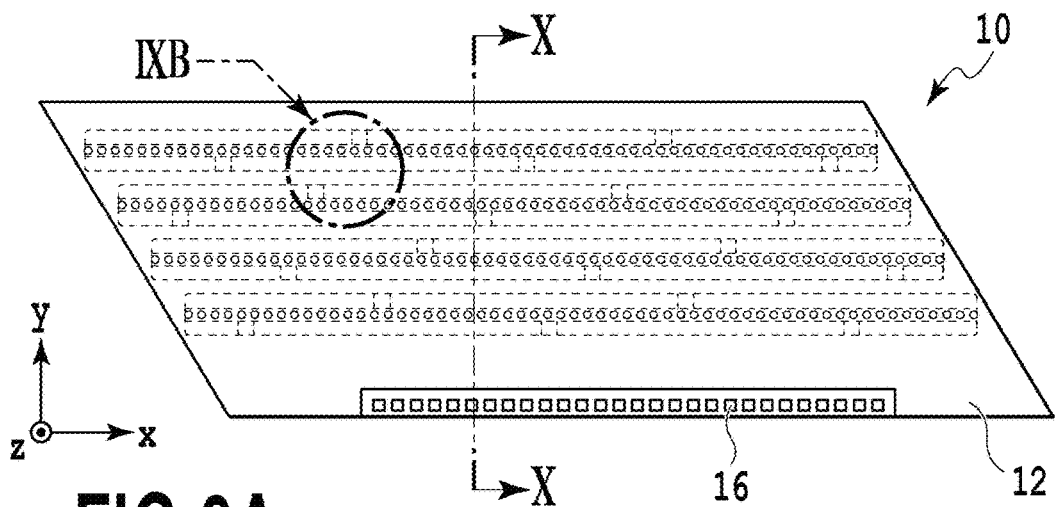
FIGS. 9A to 9C are diagrams for explaining a structure of a printing element substrate.
Figure 9B:
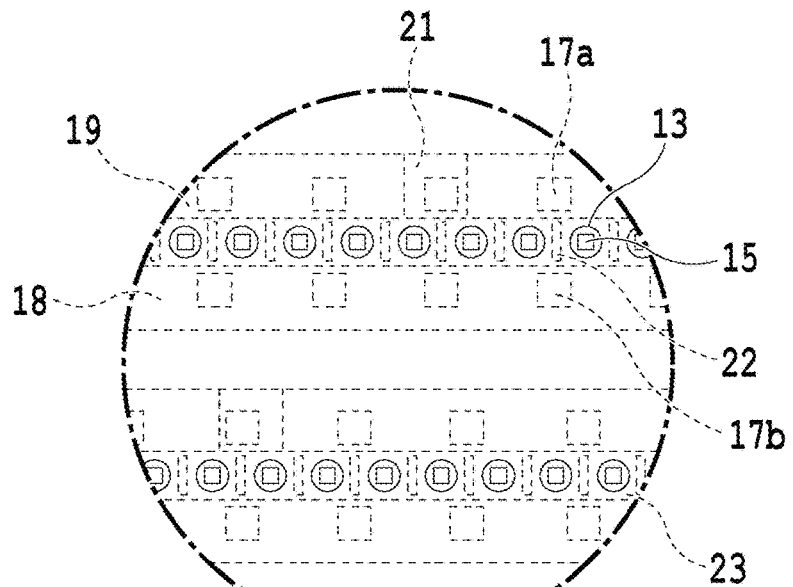
Figure 9C:
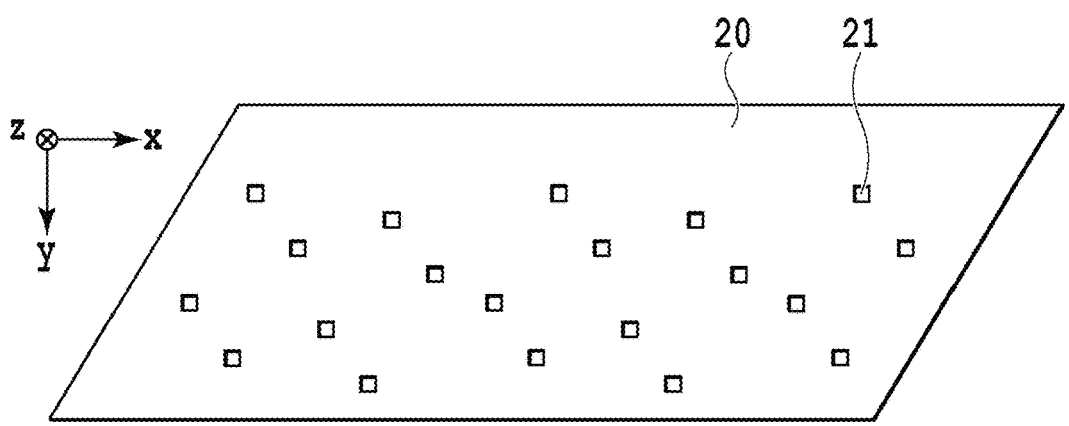
Figure 10:
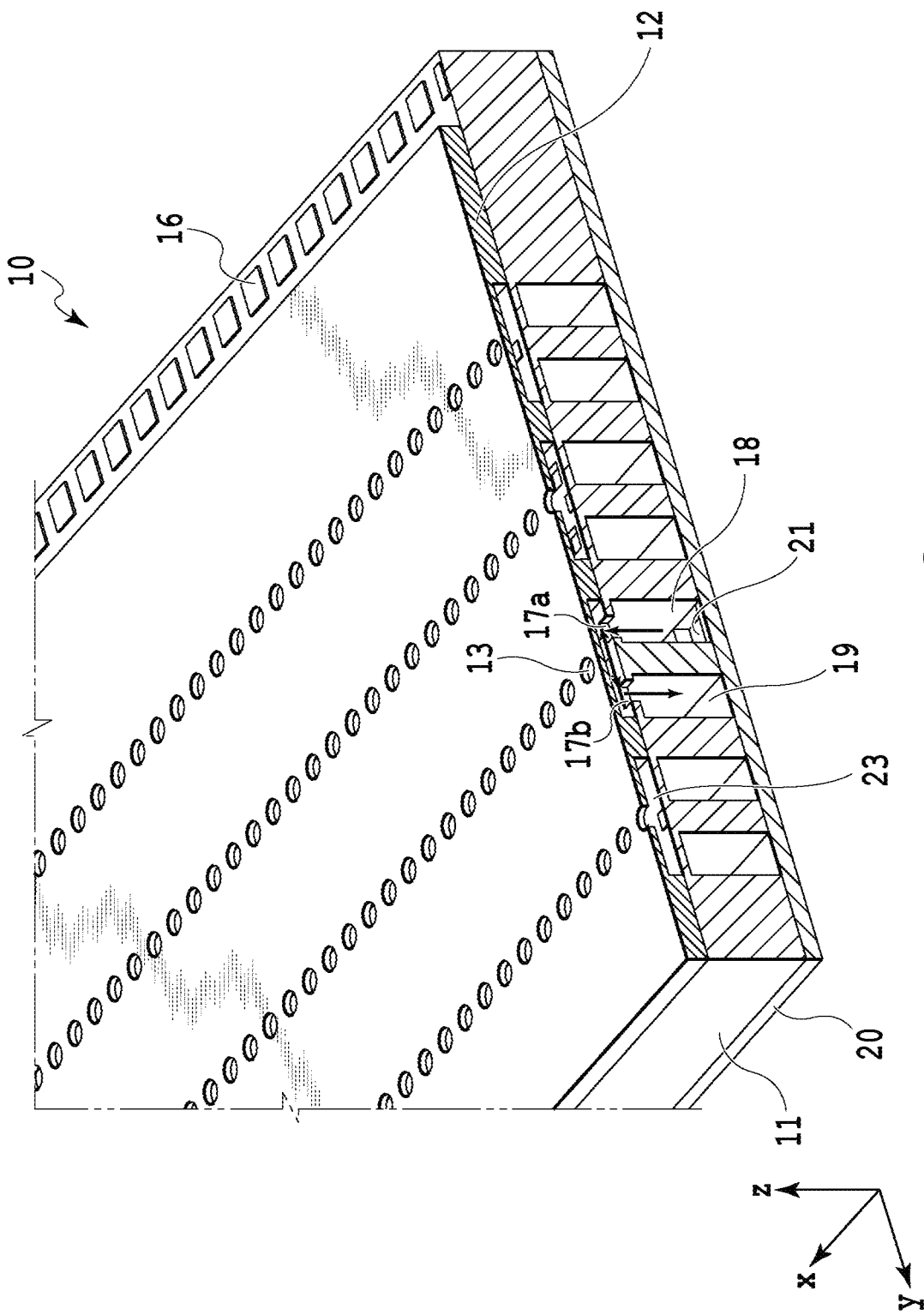
FIG. 10 is a diagram for explaining the structure of the printing element substrate.

FIGS. 9A to 9C and FIG. 10 are diagrams for explaining a structure of the printing element substrate 10. FIG. 9A is a top plan view of the printing element substrate 10, FIG. 9B is an enlarged view of a region IXB shown in FIG. 9A, and FIG. 9C is a rear view of the printing element substrate 10. Meanwhile, FIG. 10 is a cross-sectional view taken along the X-X line in FIG. 9A. As shown in FIG. 10, the printing element substrate 10 is formed mainly by stacking an ejecting port forming member 12, a substrate 11, and a lid member 20 on one another in the z direction.

As shown in the top plan view of FIG. 9A, in each ejecting port forming member 12 (the printing element substrate 10), ejecting port arrays each formed in such a way that ejecting ports 13 to eject the ink of the same color are arranged in the x direction are provided as many as the number of the ink colors and arranged in parallel in the y direction. Moreover, the terminal 16 to be bonded to the flexible wiring substrate 40 is formed at an end portion of the ejecting port forming member 12. The printing element substrate 10 of this embodiment takes on a parallelogram, and the ejecting module 200 is formed by arranging the fifteen printing element substrates 10 in the x direction.

FIG. 9B is the enlarged view of the region IXB shown in FIG. 9A. In the liquid ejecting head of this embodiment, each printing element (each nozzle) is formed from a thermoelectric conversion element 15, a pressure chamber 23, and an ejecting port 13. The pressure chamber 23 is formed from two partition walls 22 arranged in the x direction. The pressure chamber 23 incorporates an element (which is the thermoelectric conversion element 15 in this case) that generates energy used for ejecting the liquid. The thermoelectric conversion element 15 is electrically connected to the terminal 16, and its drive is controlled by a control circuit in the apparatus body through the electric wiring substrate 90 and the flexible wiring substrate 40. Based on the configuration described above, when a voltage pulse is applied to the thermoelectric conversion element 15 in accordance with the ejection data, film boiling occurs in the ink supplied to the pressure chamber 23, and growth energy of a bubble derived therefrom causes ejection of the ink from the ejecting port 13 located at a position opposite from the thermoelectric conversion element 15.

Meanwhile, a liquid supply passage 18 connected to the common supply passage 621 for supplying the ink to the pressure chambers 23 and a liquid collection passage 19 connected to the common collection passage 622 for collecting the ink from the pressure chambers 23 extend in the x direction on two sides in the y direction of each ejecting port array. Moreover, as also shown in the cross-sectional view of FIG. 10, supply ports 17*a* and collection ports 17*b* to communicate individually with the pressure chambers 23 are provided to the liquid supply passage 18 and the liquid collection passage 19, respectively. The liquid inside each pressure chamber 23 can circulate between the pressure chamber 23 and the outside through the supply port 17*a* and the collection port 17*b*.

Moreover, as also shown in FIG. 9C, the lid member 20 disposed to the side in contact with the first passage submember 50 is provided with multiple openings 21 at positions corresponding to the communication ports 51 in the first passage submember 50 so as to communicate with the liquid supply passages 18 and the liquid collection passages 19 in the printing element substrate 10, respectively. The above-described lid member 20 is required to have sufficient corrosion resistance against the liquids (the inks) and to satisfy high layout accuracy of the multiple openings 21 from the viewpoint of preventing color mixture. Therefore, it is preferable to provide the openings 21 by using a photosensitive resin material as well as a silicon plate and in accordance with a photolithographic process, for example.

According to the above-described configuration, in the liquid supply unit 4, the ink flows in the order of the opening 21, the liquid supply passage 18, the supply port 17*a*, the pressure chamber 23, the collection port 17*b*, the liquid collection passage 19, and the opening 21. Thereafter, when the thermoelectric conversion element 15 is driven while the ink flows in the pressure chamber 23, part of the ink is ejected from the ejecting port 13. In this case, the ink in the pressure chamber 23 stably flows irrespective of an ejection frequency. Accordingly, even if a thickened ink, bubbles, foreign matters, and the like are mixed therein, they are discharged (taken out) to the liquid collection passage 19 without remaining at particular positions.

Figure 11:
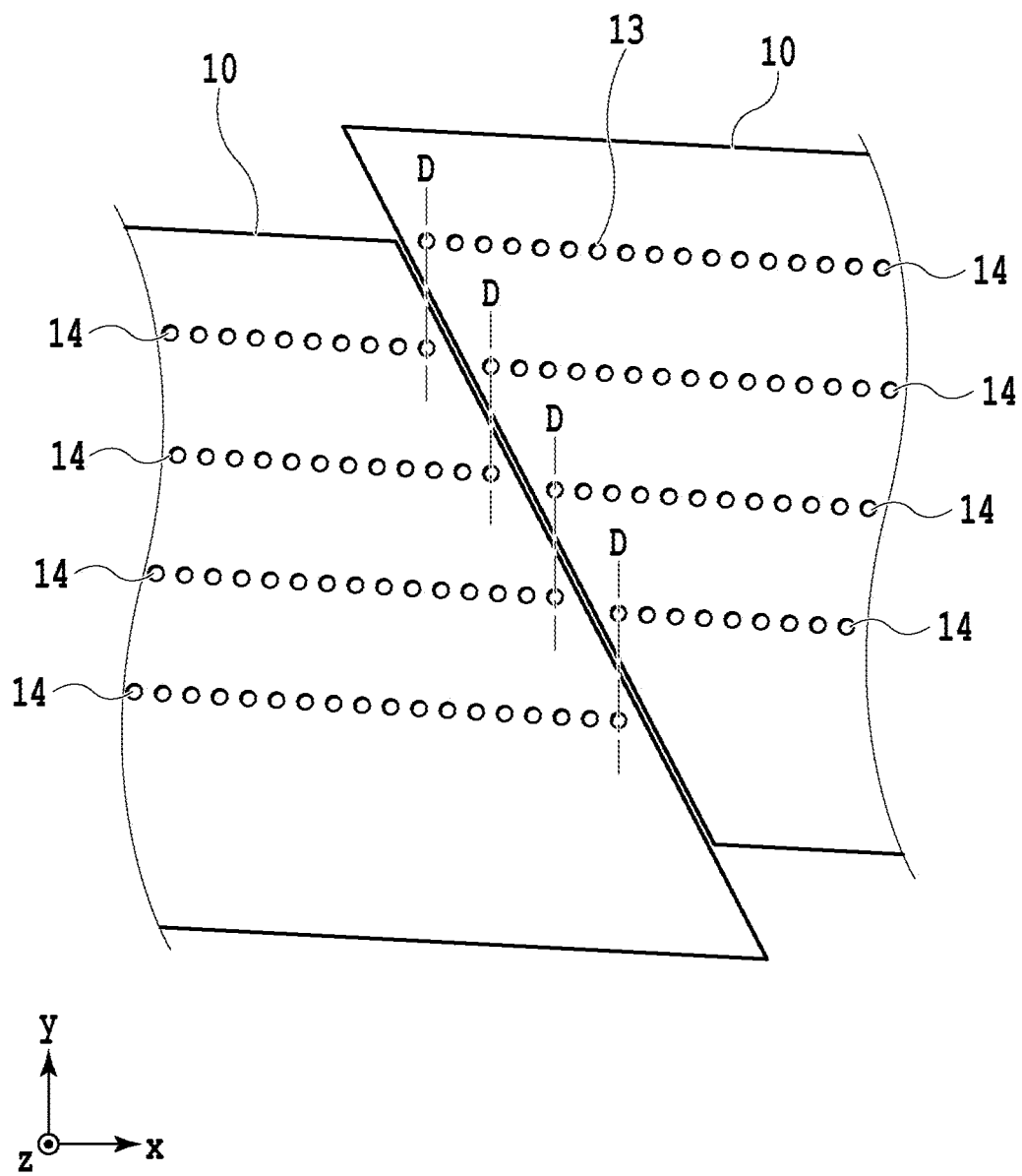
FIG. 11 is a diagram showing a state of connection of the printing element substrate.

FIG. 11 is a diagram showing a state of connection of the printing element substrate 10. As described with reference to FIG. 9A, each printing element substrate 10 of this embodiment takes on the parallelogram. Moreover, four ejecting port arrays 14 corresponding to the inks of four colors are formed by continuously arranging the multiple printing element substrates 10 in the x direction while bringing lateral sides of the adjacent printing element substrates 10 into contact with each other. Here, at connecting points of two printing element substrates 10, at least one ejecting port 13 located at a distal end portion of one of the printing element substrates 10 and an ejecting port 13 located at a distal end portion of the other printing element substrate 10 are laid out at the same position in the x direction. In other words, an oblique angle of the parallelogram is designed so as to achieve the aforementioned layout. In FIG. 11, a pair of ejecting ports 13 on a line D are laid out at the same position in the x direction.

According to the above-described configuration, even when two printing element substrates 10 are connected in a little misalignment in the course of manufacturing the liquid ejecting head, an image at a location corresponding to the connected part can be printed by cooperation of the multiple ejecting ports included in an overlapping region. Thus, it is possible to obscure streaks or voids in the image printed on a sheet, which are attributed to the misalignment. Although a principal flat surface of each printing element substrate 10 is formed into the parallelogram in this embodiment, the present invention is not limited only to this configuration. For example, it is also possible to use printing element substrates having a rectangular shape, a trapezoidal shape, and any other shapes.

(Detailed Explanation of Liquid Supply Unit)

FIGS. 12A and 12B are external perspective views of the liquid supply unit 4 of this embodiment. The liquid supply unit 4 is formed by stacking a first passage plate 222 connected to the negative pressure regulating units 2, a second passage plate 224 connected to the liquid ejecting unit 300, and an intermediate passage plate 223 to connect the first passage plate 222 to the second passage plate 224. Each of the first passage plate 222 and the second passage plate 224 takes on a substantially flat plate shape. Passage spaces for the four colors are individually formed inside the intermediate passage plate 223 and between the first passage plate 222 and the second passage plate 224.

In the first passage plate 222, contact portions 250 for the four colors, each of which includes four intermediate supply ports 240 to be connected to the corresponding negative pressure regulating unit 2 and an elastic member surrounding the intermediate supply ports 240, are arranged in parallel so as to correspond to the negative pressure regulating units 2. The four intermediate supply ports 240 correspond to the inflow port and the outflow port of the negative pressure regulating subunit H and the inflow port and the outflow port of the negative pressure regulating subunit L, respectively. Moreover, the outflow connector 111 to cause the liquid to flow out to the buffer tank 1003, and the inflow connector 112 to cause the liquid to flow in from the buffer tank 1003 are also formed in a surface of the first passage plate 222.

In the second passage plate 224, supply ports 241 for supplying the liquids regulated to a high flow pressure by the negative pressure regulating units 2 to the inflow ports 301a of the liquid ejecting unit 300 and for supplying the liquids regulated to a low flow pressure to the inflow ports 301b of the liquid ejecting unit 300 are formed. Moreover, in the second passage plate 224, collection ports 242 for collecting the liquids not consumed by the liquid ejecting unit 300 through the outflow ports 302 are formed. Contact portions 260 to come into contact with the rubber joints 100 are formed around the supply ports 241 and the collection ports 242. Here, the contact portions 250 in the first passage plate 222 and the contact portions 260 in the second passage plate 224 may be provided as surfaces to be connected to other components by means of adhesion or welding, instead of being formed as the elastic members.

Figure 13:
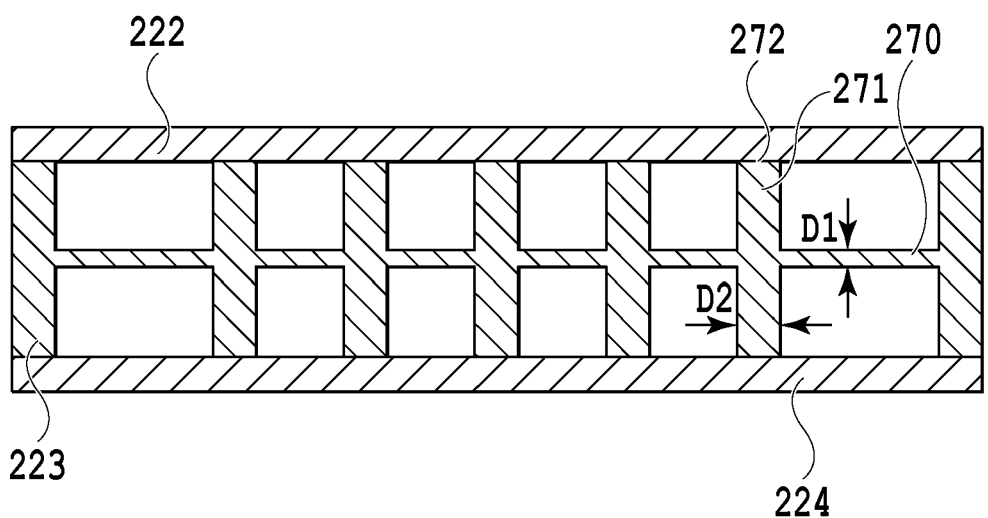
FIG. 13 is a cross-sectional view of the liquid supply unit.
Figure 13:
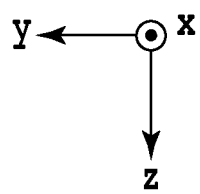

FIG. 13 is a cross-sectional view taken from FIG. 12A. The intermediate passage plate 223 includes a base portion 270 extending on an x–y plane and passage wall ribs 271 projecting in the ±z directions from the base portion 270. In this embodiment, the first passage plate 222, the second passage plate 224, and the intermediate passage plate 223 are individually formed by resin molding. Then, the liquid supply unit 4 is finished by stacking these three plates on one another in the z direction and attaching front ends 272 of the passage wall ribs 271 of the intermediate passage plate 223 to the first passage plate 222 and the second passage plate 224.

A back surface of each of the first passage plate 222 and the second passage plate 224 is bonded to the multiple passage wall ribs 271 of the intermediate passage plate 223 in the stacking process. For this reason, the surfaces of the first passage plate 222 and the second passage plate 224 are prone to deformation due to shrinkage after the molding. It is possible to suppress sinks of the contact portions and to improve flatness by forming each of the first passage plate 222 and the second passage plate 224 provided with the contact portions 250 and 260 into the flat plate. Meanwhile, by setting a thickness D1 of the base portion 270 of the intermediate passage plate 223 smaller than a thickness D2 of the passage wall ribs 271, it is possible to suppress sinks of the front ends 272 of the passage wall ribs 271 and thus to improve reliability of bonding to the passage plates.

FIGS. 14A to 14F are diagrams showing a die slide injection molding process for forming the liquid supply unit 4 of this embodiment. As shown in FIG. 14A, a mold assembly K001 used in this embodiment includes a fixed mold K100 and a movable mold K200 that is detachable in the z direction from the fixed mold K100. Moreover, a die slide mold K210 that is slidable in the y direction relative to the fixed mold K100 is further provided inside the movable mold K200.

In the state where the fixed mold K100 and the movable mold K200 are clamped together as shown in FIG. 14A, a die for molding the second passage plate 224 is located at a first molding position K410. In addition, a die for molding the intermediate passage plate 223 is located at a second molding position K420, and a die for molding the first passage plate 222 is located at a third molding position K430, respectively. In the above-described clamped state, a resin is injected into the first molding position K410, the second molding position K420, and the third molding position K430, respectively, by using not-illustrated injection nozzles. Thus, the second passage plate 224 is molded at the first molding position K410, the intermediate passage plate 223 is molded at the second molding position K420, and the first passage plate 222 is molded at the third molding position K430, respectively. The above-described process will be hereinafter referred to as a first molding step.

In a second step, the movable mold K200 is detached from the fixed mold K100 by moving the movable mold K200 in the +z direction relative to the fixed mold K100. FIG. 14B shows a state of the fixed mold K100 and the movable mold K200 at this stage. In the detached state, the first passage plate 222 and the intermediate passage plate 223 follow the fixed mold K100 while the second passage plate 224 follows the die slide mold K210, that is, the movable mold K200. In other words, the contact portions 250 of the first passage plate 222 are held by the fixed mold K100 while the contact portions 260 of the second passage plate 224 are held by the die slide mold K210.

In a third step, the die slide mold K210 disposed inside the movable mold K200 is moved in the −y direction to perform positioning between the second passage plate 224 and the intermediate passage plate 223 in the y direction. Then, as shown in FIG. 14C, the movable mold K200 is moved in the −z direction so as to clamp the movable mold K200 and the fixed mold K100 together again. Furthermore, in this state, a resin compatible with the second passage plate 224 and the intermediate passage plate 223 is fed from a not-illustrated injection nozzle into a position where the second passage plate 224 is supposed to be bonded to the intermediate passage plate 223. In this way, the second passage plate 224 is bonded to the intermediate passage plate 223. The above-described process will be hereinafter referred to as a second molding step.

In a fourth step, the movable mold K200 is detached from the fixed mold K100 by moving the movable mold K200 again in the +z direction relative to the fixed mold K100. FIG. 14D shows a state of the fixed mold K100 and the movable mold K200 at this stage. In the detached state, the first passage plate 222 follows the fixed mold K100 while the second passage plate 224 and the intermediate passage plate 223 bonded thereto follow the die slide mold K210, that is, the movable mold K200. In other words, at the point of completion of the fourth step, the contact portions 250 of the first passage plate 222 are held by the fixed mold K100 while the contact portions 260 of the second passage plate 224 are held by the die slide mold K210 as with the state at the point of completion of the second step.

In a fifth step, the die slide mold K210 disposed inside the movable mold K200 is moved further in the −y direction to perform positioning between the first passage plate 222 and the intermediate passage plate 223 in the y direction. Then, as shown in FIG. 14E, the movable mold K200 is moved in the −z direction so as to clamp the movable mold K200 and the fixed mold K100 together. Furthermore, in this state, a resin compatible with the first passage plate 222 and the intermediate passage plate 223 is fed from a not-illustrated injection nozzle into a position where the first passage plate 222 is supposed to be bonded to the intermediate passage plate 223. In this way, the second passage plate 224, the intermediate passage plate 223, and the first passage plate 222 are bonded to one another. The above-described process will be hereinafter referred to as a third molding step.

In a sixth step, the movable mold K200 is detached from the fixed mold K100 by moving the movable mold K200 again in the +z direction relative to the fixed mold K100. FIG. 14F shows a state of the fixed mold K100 and the movable mold K200 at this stage. In the detached state, all of the first passage plate 222, the intermediate passage plate 223, and the second passage plate 224 which are bonded to one another follow the die slide mold K210, that is, the movable mold K200. In other words, at the point of completion of the sixth step, the contact portions 250 of the first passage plate 222 are detached from the fixed mold K100 for the first time, and the entire liquid supply unit 4 is held by the die slide mold K210.

According to the above-described molding process, the surface (the surface in the −z direction) of the first passage plate 222 and the surface (the surface in the +z direction) of the second passage plate 224 remain held on the molds used for molding the passage plates, respectively, until the liquid supply unit 4 is finished. Thus, it is possible to suppress effects of undulation and warpage due to demolding or shrinkage as compared to the case of resin molding the first passage plate 222, the intermediate passage plate 223, and the second passage plate 224, respectively, without employing the die slide injection molding, and then attaching these plates to one another. As a consequence, it is possible to mold the highly reliable liquid supply unit while suppressing leakage of a gas of a liquid attributed to deformation in the manufacturing process.

Other Embodiments

The above-described embodiment has explained the configuration in which the three components molded in the first molding step are bonded to one another stepwise by undergoing the moving steps twice and the molding steps twice. Instead, the components may be bonded to one another all at once. Such an aspect can be realized by preparing a first movable mold detachable in the +z direction from the fixed mold, a second movable mold detachable in the −z direction from the fixed mold, and die slide molds annexed to the respective movable molds in such a way as to be slidable in the ±y directions. Even in this configuration, the surface of the first passage plate 222 and the surface of the second passage plate 224 can be held onto the molds used for molding the respective plates until the liquid supply unit 4 is finished. Accordingly, this configuration can also suppress the deformation as with the above-described embodiment.

Figure 15:
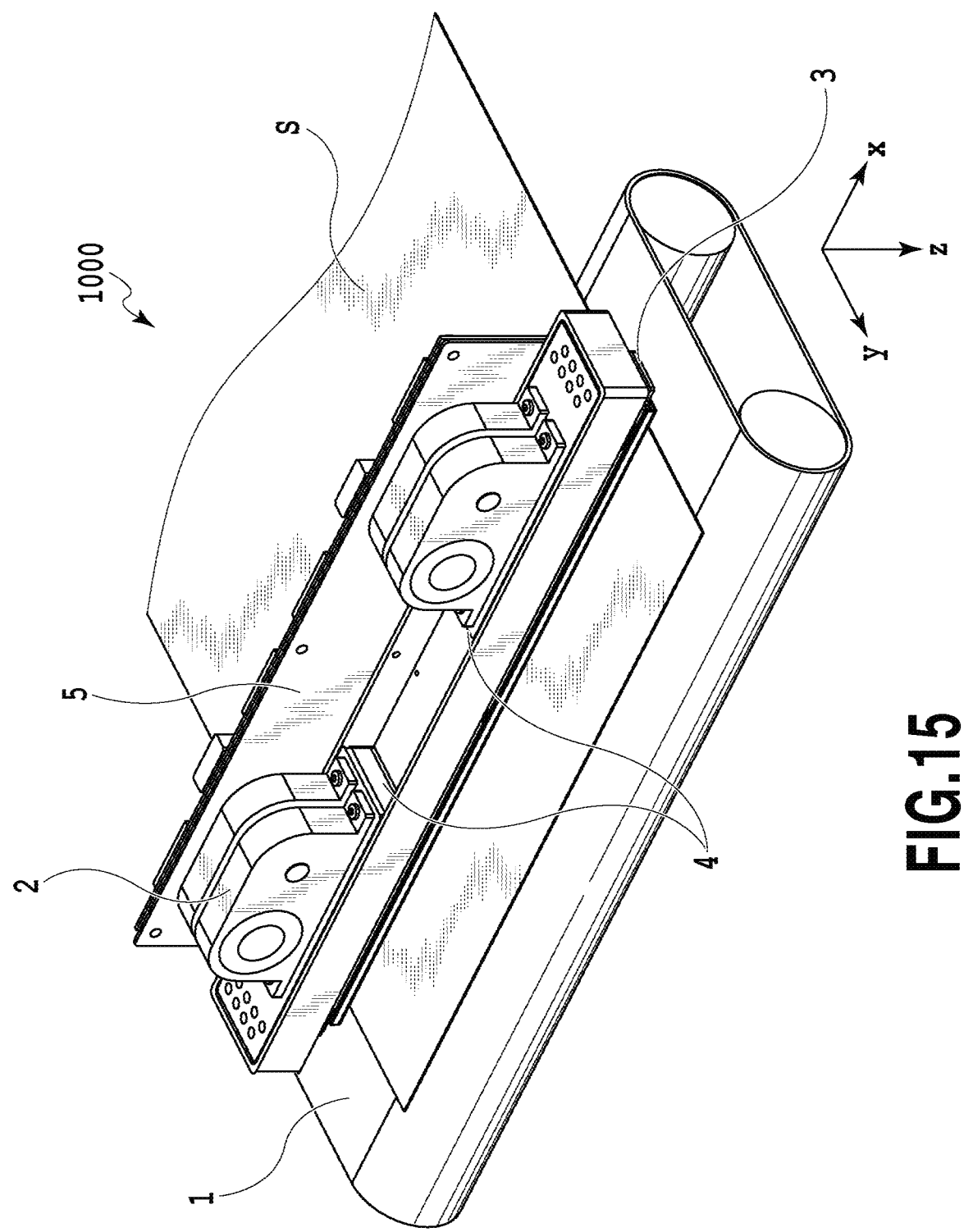
FIG. 15 is an external perspective view for explaining a liquid supply unit having a different form.

In the meantime, the description has been made above based on the premise that the liquid supply unit 4 is provided in common to the inks of four colors and has the width in the x direction equal to that of the apparatus as shown FIG. 1 and FIG. 3B, as the configuration example that places more importance on the flatness. However, the present invention is obviously not limited to this configuration. For example, as shown in FIG. 15, it is also possible adopt a configuration to use two liquid supply units, each of which has a shorter width in the x direction than that of the apparatus, and corresponds to the inks of two colors. Even in this case, the liquid supply units can further reduce the fear of deformation and improve the flatness as long as the liquid supply units are molded in accordance with the process described with reference to FIGS. 14A to 14F. Naturally, two liquid supply units split in the y direction may be provided instead of the two liquid supply units split in the x direction. Alternatively, liquid supply units may also be prepared independently for the respective ink colors.

Furthermore, although the inkjet printing apparatus 1000 shown in FIG. 1 has been described above as the example, it is to be noted that the liquid ejecting apparatus applicable to the present invention is not limited only to the inkjet printing apparatus 1000. The present invention can function effectively in other liquid supply units irrespective of usage of liquids supplied thereto as long as each of such liquid supply units includes a complicated passage structure inside and has a flat plate shape.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-228216 filed Nov. 24, 2016, which is hereby incorporated by reference wherein in its entirety.

What is claimed is:

1. A method of manufacturing a liquid supply unit configured to supply a liquid to a liquid ejecting head, comprising:

a first molding step of injecting a first resin into different positions inside a fixed mold and a movable mold, in a state of clamping the fixed mold and the movable mold, which is detachable from the fixed mold in a first direction, to mold, at the different positions, respectively, a first member including a first contact portion to be connected to another component, a second member including a second contact portion to be connected to still another component, and an intermediate passage member to be located between the first member and the second member and including a passage structure to connect the first contact portion to the second contact portion; and a second molding step of bonding the first member, the second member, and the intermediate passage member to one another by detaching the movable mold in the first direction from the fixed mold after the first molding step, moving a die slide mold disposed inside the movable mold in a second direction different from the first direction to perform positioning among the first member, the second member, and the intermediate passage member in the second direction, clamping the fixed mold and the movable mold, and injecting a second resin into the fixed mold and the movable mold, wherein the first contact portion and the second contact portion are respectively held on same surfaces inside the fixed mold or the die slide mold during a period from the first molding step to completion of the second molding step, wherein each of the first member and the second member has a flat plate shape, wherein the liquid ejecting head is a full-line type inkjet printing head for printing an image on a printing medium, wherein a plurality of first contact portions are provided to the first member, and wherein a plurality of second contact portions are provided to the second member.

2. The method according to claim 1, wherein the first member and the second member have a width equal to a width of the liquid ejecting head.

3. The method according to claim 1, wherein the inkjet printing head is capable of ejecting inks of a plurality of colors, and wherein the passage structure of the intermediate passage member is prepared corresponding to each of the inks of the plurality of colors.

4. The method according to claim 1, wherein the intermediate passage member includes:

a base portion provided substantially parallel to the first member and the second member; and ribs projecting from the base portion and coming into contact with the first member and the second member, respectively, and wherein a thickness of the base portion is smaller than a thickness of each of the ribs.

5. The method according to claim 1, wherein the first resin is compatible with the second resin.

* * * * *